United States Patent
Moon

(10) Patent No.: US 12,101,626 B2
(45) Date of Patent: Sep. 24, 2024

(54) CONTROL INFORMATION RECEPTION DEVICE AND METHOD, SIGNAL MEASUREMENT DEVICES, AND LOCATION MEASUREMENT SERVER AND METHOD

(71) Applicants: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(72) Inventor: Hi Chan Moon, Seoul (KR)

(73) Assignees: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

( * ) Notice: Subject to any disclaimer, the term of this patent is extended or adjusted under 35 U.S.C. 154(b) by 862 days.

(21) Appl. No.: 17/259,391

(22) PCT Filed: Jul. 12, 2019

(86) PCT No.: PCT/KR2019/008639
§ 371 (c)(1),
(2) Date: Jan. 11, 2021

(87) PCT Pub. No.: WO2020/013658
PCT Pub. Date: Jan. 16, 2020

(65) Prior Publication Data
US 2024/0031974 A1    Jan. 25, 2024

(30) Foreign Application Priority Data

Jul. 12, 2018 (KR) .................. 10-2018-0081013
Oct. 15, 2018 (KR) .................. 10-2018-0122514
Jul. 11, 2019 (KR) .................. 10-2019-0083717

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0048* (2013.01); *H04W 72/0446* (2013.01); *H04W 72/23* (2023.01)

(58) Field of Classification Search
None
See application file for complete search history.

(56) References Cited

U.S. PATENT DOCUMENTS

2010/0195566 A1    8/2010    Krishnamurthy
2014/0036747 A1    2/2014    Nory et al.
(Continued)

FOREIGN PATENT DOCUMENTS

CN    101861744 A    10/2010
CN    104838687 A    8/2015
(Continued)

OTHER PUBLICATIONS

International Search Report for PCT/KR2019/008639 dated, Oct. 28, 2019 (PCT/ISA/210).

*Primary Examiner* — Kenneth B Wells
(74) *Attorney, Agent, or Firm* — Sughrue Mion, PLLC

(57) ABSTRACT

The present embodiments relate to a method and a device for obtaining location information of a terminal by using a mobile communication system and provide a method and a device capable of securing location and movement information of a terminal even when the terminal changes call settings or carries out a handover. In particular, a control information reception device according to the present dis- (Continued)

closure comprises: one or more downlink signal reception units for receiving downlink signals from a base station; a control unit for obtaining control information about a terminal from the downlink signals; and a communication unit for transmitting the control information about the terminal to a location measurement server.

7 Claims, 21 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2014/0328329 A1* | 11/2014 | Novlan | H04W 56/0015 370/336 |
| 2015/0009905 A1 | 1/2015 | Barbieri et al. | |
| 2015/0016377 A1* | 1/2015 | Kim | H04W 72/23 370/329 |
| 2015/0326463 A1 | 11/2015 | Solondz | |
| 2016/0050534 A1* | 2/2016 | Lim | H04W 64/00 370/252 |
| 2016/0205499 A1 | 7/2016 | Davydov et al. | |
| 2016/0286353 A1 | 9/2016 | Barlev | |
| 2017/0347340 A1* | 11/2017 | Haley | H04L 25/03343 |

FOREIGN PATENT DOCUMENTS

| | | |
|---|---|---|
| EP | 2 575 386 A1 | 4/2013 |
| JP | 2016-500214 A | 1/2016 |
| KR | 10-2014-0031238 A | 3/2014 |
| KR | 10-2014-0080298 A | 6/2014 |
| KR | 10-2015-0106959 A | 9/2015 |
| WO | 2016/068542 A2 | 5/2016 |

* cited by examiner

CONTROL INFORMATION RECEPTION DEVICE AND METHOD, SIGNAL MEASUREMENT DEVICES, AND LOCATION MEASUREMENT SERVER AND METHOD

This application is a National Stage of International Application No. PCT/KR2019/008639 filed on Jul. 12, 2019, claiming priority based on Korean Patent Application No. 10-2018-0081013 filed on Jul. 12, 2018, Korean Patent Application No. 10-2018-0122514 filed on Oct. 15, 2018 and Korean Patent Application No. 10-2019-0083717 filed on Jul. 11, 2019.

TECHNICAL FIELD

The present disclosure relates to methods and devices for acquiring location information of a terminal by using a mobile communication system.

BACKGROUND ART

FIG. 1 illustrates a structure of a terminal in a mobile communication system. Referring to FIG. 1, the terminal includes an antenna 130, a downlink (DL) signal receiver 110, and an uplink (UL) signal transmitter 120.

Further, FIG. 2 illustrates a structure of a base station of the mobile communication system. Referring to FIG. 2, the base station includes an antenna 230, an uplink signal receiver 210 and a downlink signal transmitter 220.

When communication devices or apparatuses shown in FIG. 1 or FIG. 2 are used, there is a problem that it is difficult to acquire traffic information including the location of other terminals in an intersection or a specific area. For example, a communication device having the structure shown in FIG. 1 cannot acquire information on a signal transmitted by one or more other terminals, that is, an uplink signal.

Further, a communication device having the structure shown in FIG. 2 can partially acquire data transmitted by one or more other terminals, but it is difficult for this communication device to acquire information transmitted by a base station.

For acquiring a location and movement information of other terminals by using the communication device having the structure shown in FIG. 2, it is possible to consider a method of installing a plurality of repeaters or small cells and then acquiring information on one or more terminals located within a coverage area of the repeaters or small cells.

However, the repeater or the small cell equipment may be installed only by communication service providers, and when the communication service providers do not want to install them due to expected poor profitability of a corresponding business, and the like, it is not possible to implement such a scenario in actual.

Meanwhile, recently, for public services, a third party, not a communication service provider, has attempted to acquire a location or movement information of terminals placed in a specific area. As an example, public organizations of the Korea Expressway Corporation and the Korea National Police Agency have attempted to acquire information such as the number or speed of terminals passing through a specific area.

In such a situation, a method of allowing a third party other than a communication service provider to acquire information on a location or traffic of terminals placed in a specific area for the purpose of public service has not been provided yet. In particular, there is a substantial limitation that methods of acquiring such information should be implemented without affecting communication equipment and communication networks which have been already installed.

Further, there is a growing need for determining a location of a terminal or mobility information of the terminal in various fields, such as new additional services, smart cities, smart buildings, and the like.

DETAILED DESCRIPTION OF THE INVENTION

Technical Problem

Accordingly, the present disclosure provides devices and methods of measuring a location of one or more other terminals by acquiring control information of downlink and determining an uplink signal based on this. In addition, the present disclosure provides devices and methods of acquiring movement information of a terminal by using two or more signal measurement devices.

Further, the present disclosure provides devices and methods of measuring a location of one or more other terminals by acquiring resource assignment information of uplink and determining an uplink signal based on this in a multi-band environment.

Technical Solution

To address issues described above, in accordance with one aspect of the present disclosure, a control information reception device is provided that comprises one or more downlink signal receivers receiving a downlink signal from a base station, a controller acquiring control information on a terminal based on the downlink signal, and a communication unit transmitting the control information on the terminal to a location measurement server.

In accordance with another aspect of the present disclosure, a signal measurement device is provided that comprises one or more downlink signal receivers receiving a downlink signal, a controller acquiring uplink resource assignment information, and one or more uplink signal receivers receiving an uplink signal based on the uplink resource assignment information, the controller changing an operation frequency as time passes.

In accordance with further another aspect of the present disclosure, a location measurement server is provided that comprises a communication unit receiving identifier information of a terminal and information an uplink signal transmitted by the terminal from one or more signal measurement devices, and receiving control information on the terminal from a control information reception device, and a controller calculating a location and movement information of the terminal based on the identifier information of the terminal, the information on the uplink signal transmitted by the terminal and the control information on the terminal.

In accordance with yet another aspect of the present disclosure, a signal measurement method is provided for receiving a downlink signal from a base station, acquiring control information on a terminal based on the downlink signal, and transmitting the control information on the terminal to a location measurement server.

In accordance with still yet another aspect of the present disclosure, a location measurement method is provided for receiving identifier information of a terminal and information on an uplink signal transmitted by the terminal from one or more signal measurement devices, receiving control information on the terminal from a control information reception device, and calculating a location and movement information of the terminal based on the identifier information of the terminal, the information on the uplink signal transmitted by the terminal and the control information on the terminal.

Effects of the Invention

According to various aspects of the present disclosure, devices and methods are provided for acquiring the presence or absence of a terminal, a location and movement information of the terminal, and the like. Further, according to various aspects of the present disclosure, a location and movement information of the terminal can be acquired while the terminal performs a handover. In addition, according to various aspects of the present disclosure, it is possible to acquire information on a location of one or more neighboring terminals placed in multiple bands, and the like.

BEST MODE FOR CARRYING OUT THE INVENTION

Figure 1:
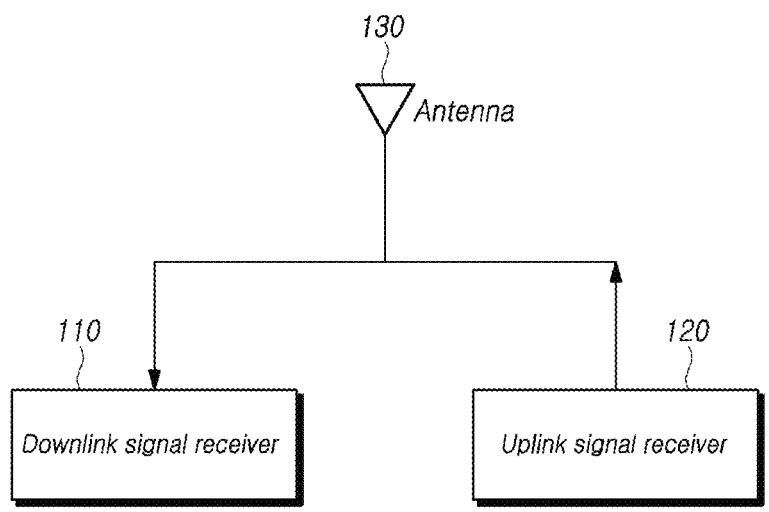
FIG. 1 illustrates a configuration of a terminal.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, detailed discussions on known functions and configurations incorporated herein may be omitted when it is needed to focus on the subject matter of the present disclosure.

In the present disclosure, a wireless communication system denotes a system for providing various communication services such as a voice communication service, a packet data service, etc. The wireless communication system includes a terminal (includes a user device or a user equipment (UE)) and a base station (BS).

The terminal is a generic term referring to devices used in wireless communication. For example, the terminal may be referred to as, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally denote a station communicating with the terminal. The base station or cell is a generic term referring to, but not limited to, all of various communication service areas and devices, such as a. Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of these various cells is controlled by a base station. Therefore, the base station may be classified into two types. 1) One type of the base station may denote an apparatus providing a megacell, a macrocell, a microcell, a picocell, a femtocell, or a small cell that forms a communication service area, and 2) the other type of the base station may denote the communication service area. Apparatuses that form and provide a certain radio area, and that are controlled by one or more identical entities or that interact with one another for enabling two or more entities to cooperate with one another to provide the radio area may be referred to as the type 1) base station. According to a scheme of forming and providing a communication service area, a point, a transmission/reception point, a transmission point, a reception point, or the like is an example of this type of base station. A communication service area itself to which a terminal or a neighboring base station transmits a signal or from which the terminal or the neighboring base station receives a signal may be denoted as the type 2) base station.

In the present disclosure, the cell may denote a coverage of a signal transmitted from a transmission/reception point, a component carrier having a coverage of a signal transmitted from a transmission point or a transmission/reception point, or a transmission/reception point itself.

The terminal and the base station herein are entities for performing two types of transmissions or receptions (uplink and downlink) used to embody embodiments, examples, technologies, or technical ideas described in the present disclosure. Thus, the terminal and the base station herein include all entities capable of performing such operations and are not limited to specific terms or words.

Herein, the uplink (hereinafter, referred to as "UL") refers to data transmission/reception by a UE to/from a base station, and the downlink (hereinafter, referred to as "DL") refers to data transmission/reception by a base station to/from a UE.

An uplink transmission and a downlink transmission may be performed using a time division duplex (TDD) technique in which a transmission can be performed at a time different from another transmission, a frequency division duplex (FDD) technique in which a transmission can be performed at a frequency different from another transmission, or a hybrid technique of the frequency division duplex (FDD) and the time division duplex (TDD).

Further, in a standard for a wireless communication system, uplink and downlink are configured based on a single carrier or a pair of carriers.

Control information is transmitted in the uplink and/or the downlink configured with a control channel, such as a physical downlink control channel (PDCCH), a physical uplink control channel (PUCCH), and the like, and Data are transmitted in the uplink and/or the downlink configured with a data channel, such as a physical downlink shared channel (PDSCH), a physical uplink shared channel (PUSCH), and the like.

The downlink may denote communication or a communication path from multiple transmission/reception points to a terminal, and the uplink may denote communication or a communication path from the terminal to the multiple transmission/reception points. In the downlink, a transmitter may be a part of multiple transmission/reception points, and a receiver may be a part of a terminal. In the uplink, a transmitter may be a part of a terminal and a receiver may be a part of multiple transmission/reception points.

Hereinafter, a situation where a signal is transmitted or received through a channel such as the PUCCH, the PUSCH, the PDCCH, or the PDSCH, may be expressed as the transmission or reception of the PUCCH, the PUSCH, the PDCCH, or the PDSCH.

Meanwhile, higher layer signaling herein includes radio resource control (RRC) signaling transmitting RRC information containing an RRC parameter.

A base station performs a downlink transmission to terminals. The base station may transmit a physical downlink control channel for transmitting i) downlink control information, such as scheduling required to receive a downlink data channel that is a primary physical channel for a unicast transmission, and ii) scheduling approval information for a transmission through an uplink data channel. Hereinafter, transmitting/receiving a signal through each channel may be described in such a manner that a corresponding channel is transmitted/received.

Any of multiple access techniques applied to wireless communication systems may be applicable to a wireless communication system of the present disclosure. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments or examples described in the present disclosure may be applicable to resource assignment in both an asynchronous wireless communication evolving into LTE/LTE-advanced and IMT-2020 from GSM, WCDMA, and HSPA, and a synchronous wireless communication evolving into code division multiple access, CDMA-2000, and UMB.

In the present disclosure, a machine type communication (MTC) terminal may denote a terminal supporting low costs (or low complexity), a terminal supporting coverage enhancement, or the like. As another example, the MTC terminal may denote a terminal defined as a predetermined category for supporting low cost (or low complexity) and/or coverage enhancement.

In other words, the MTC terminal herein may denote a low cost (or low complexity) user equipment category/type newly defined in 3GPP Release-13 and performing LTE-based MTC-related operations. The MTC terminal may denote a user equipment category/type defined in or before 3GPP Release-12, which supports enhanced coverage in comparison with the typical LTE coverage or supports low power consumption. The MTC terminal may also denote a low cost (or low complexity) user equipment category/type newly defined in Release-13. The MTC terminal may denote a further enhanced MTC terminal defined in Release-14.

In the present disclosure, a NarrowBand Internet of Things (NB-IoT) terminal denotes a terminal supporting radio access for cellular IoT. NB-IoT technology has been developed to provide improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

The present disclosure relates to methods and apparatuses for acquiring information on a location of a terminal in a wireless communication system, particularly a mobile communication system.

In the present disclosure, a device with a new structure is proposed in which a downlink signal receiver and an uplink signal receiver are integrally implemented. The proposed device may include one or more uplink signal receivers, and in this case, each uplink signal receiver may be installed in a physical location different from one another.

The device according to this embodiment can acquire information on one or more signals that may be transmitted from a terminal to a base station through uplink by analyzing a downlink signal transmitted by the base station. Further, it is possible to determine whether data of the uplink are transmitted from the terminal to the base station through one or more uplink signal receivers, and identify a location of the terminal.

Embodiments and examples of the present disclosure are related to a technology for acquiring a location and movement information of terminals in the wireless communication system.

Embodiments and examples of the present disclosure are related to devices and methods of providing traffic information and public services through the wireless communication system.

Embodiments and examples of the present disclosure are expected to be applied in various fields of road control, traffic control, and security.

A related technology that is closely associated with the embodiments or examples of the present disclosure is mobile communication systems.

In a system including two or more devices capable of measuring a location of a terminal or acquiring information related to the location of the terminal according to embodiments of the present disclosure, the location information measurement device includes one or more downlink signal receivers, one or more uplink signal receivers, and a controller controlling the one or more downlink signal receivers and the one or more uplink signal receivers. The controller can acquire uplink resource assignment information, determine whether an uplink signal is received based on the uplink resource assignment information, and acquire mobility information of the terminal based on measurement information from two or more location measurement devices.

Hereinafter, embodiments of the present disclosure will be discussed in detail with reference to accompanying drawings. Further, in describing embodiments of the present disclosure, detailed discussions on known functions and configurations incorporated herein may be omitted when it is needed to focus on the subject matter of the present disclosure. The terms described below are terms defined considering embodiments, examples, and technical ideas in the present disclosure, and may be differently expressed according to intentions or customs of a user, an operator, or the like. Thus, such definition should be interpreted based on the context of the present disclosure Meanwhile, each of embodiments or examples described below may be applicable individually or in any combination with one or more other embodiments or examples.

Figure 2:
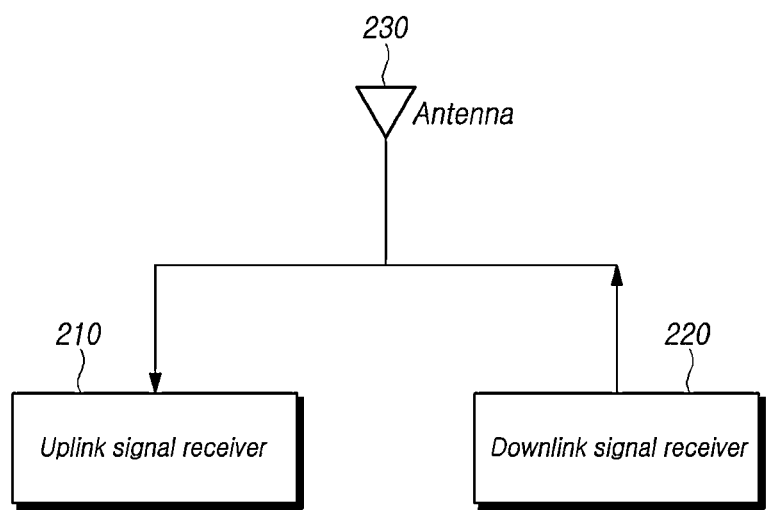
FIG. 2 illustrates a configuration of a base station.
Figure 3:
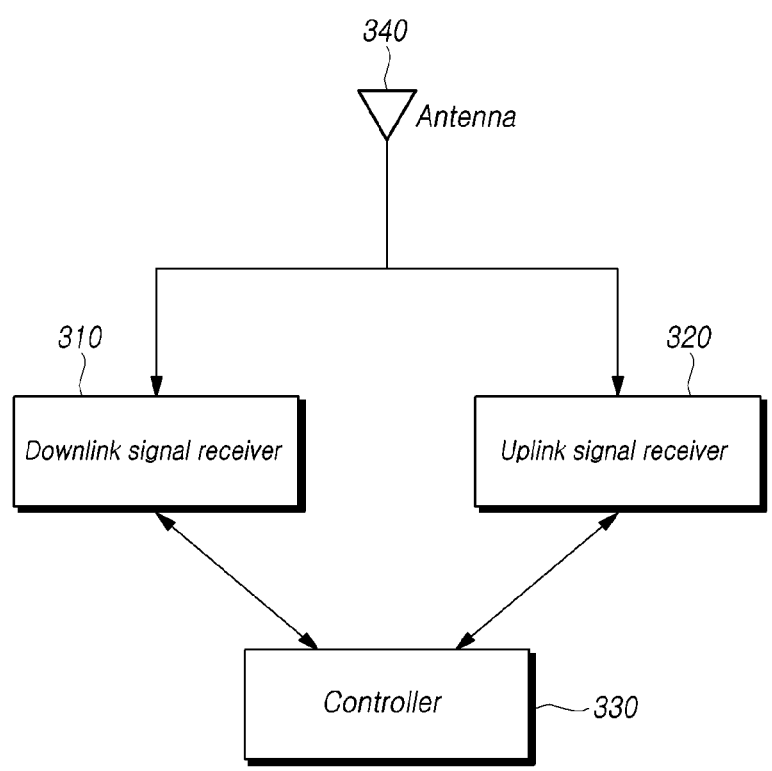
FIG. 3 illustrates a configuration of a signal measurement device according to an aspect of the present disclosure.

FIG. 3 illustrates a configuration of a signal measurement device according to an embodiment of the present disclosure. Referring to FIG. 3, the signal measurement device may include a downlink signal receiver 310, an uplink signal receiver 320 and an antenna 340. Thus, the device according to this embodiment can receive signals of both uplink and downlink unlike the devices illustrated in FIGS. 1 and 2.

In the structure of FIG. 3, signals of both uplink and downlink can be received via a single antenna. Further, this communication device can control the uplink signal receiver 320 and the downlink signal receiver 310 to interoperate with each other through a controller 330.

FIG. 3 illustrates an embodiment in which the uplink signal receiver 320 and the downlink signal receiver 310 use the same antenna; however, an uplink signal reception antenna and a downlink signal reception antenna may be implemented separately from each other.

Figure 4:
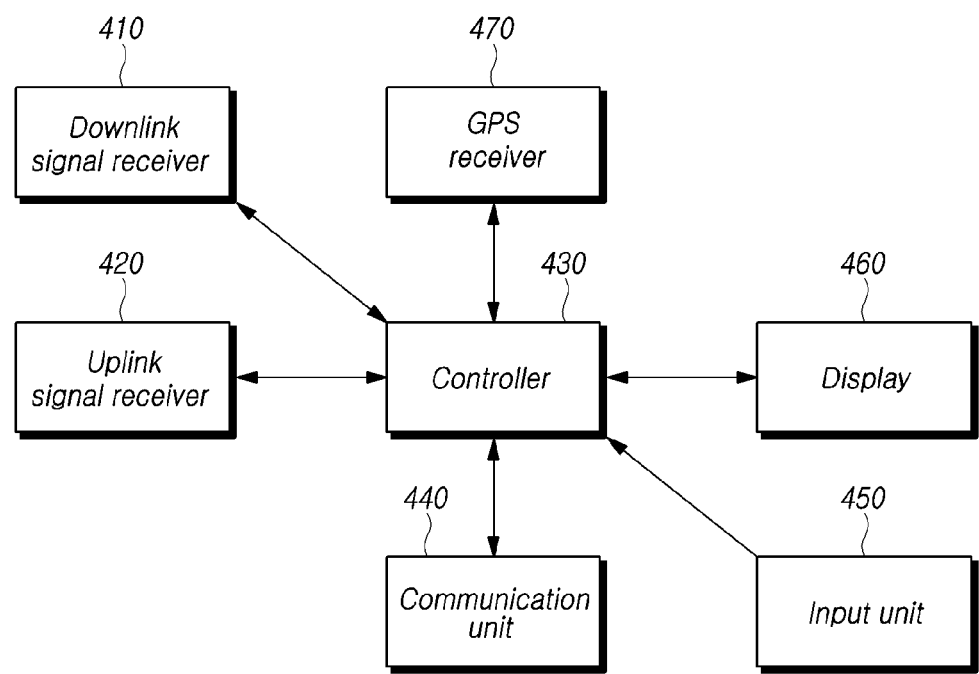
FIG. 4 illustrates a configuration of a signal measurement device according to another aspect of the present disclosure.

FIG. 4 illustrates a configuration of a signal measurement device according to another embodiment of the present disclosure.

Referring to FIG. 4, the signal measurement device of FIG. 4 includes a downlink signal receiver 410, an uplink signal receiver 420, a controller 430, and a communication unit 440 for communication with other devices or systems. The communication unit 440 of the present disclosure is connected with a location measurement server wirelessly or through a wired connection, and thus enables the signal measurement device of the present disclosure to provide information to the location measurement server. Further, control information of the location measurement server, information related to resource assignment for a terminal, and the like can be received through the communication unit 440. Further, the signal measurement device of FIG. 4 may further include a GPS receiver 470 capable of acquiring location and time information. The GPS receiver 470 enables multiple signal measurement devices to acquire synchronization in time, enables the signal measurement devices to measure a signal from a single terminal. Thus, a location of a terminal can be measured more accurately based on the measurements. Further, the signal measurement device of FIG. 4 may further include an input unit 450 for enabling a user to input or output control information and other information, and a display 460.

Figure 5:
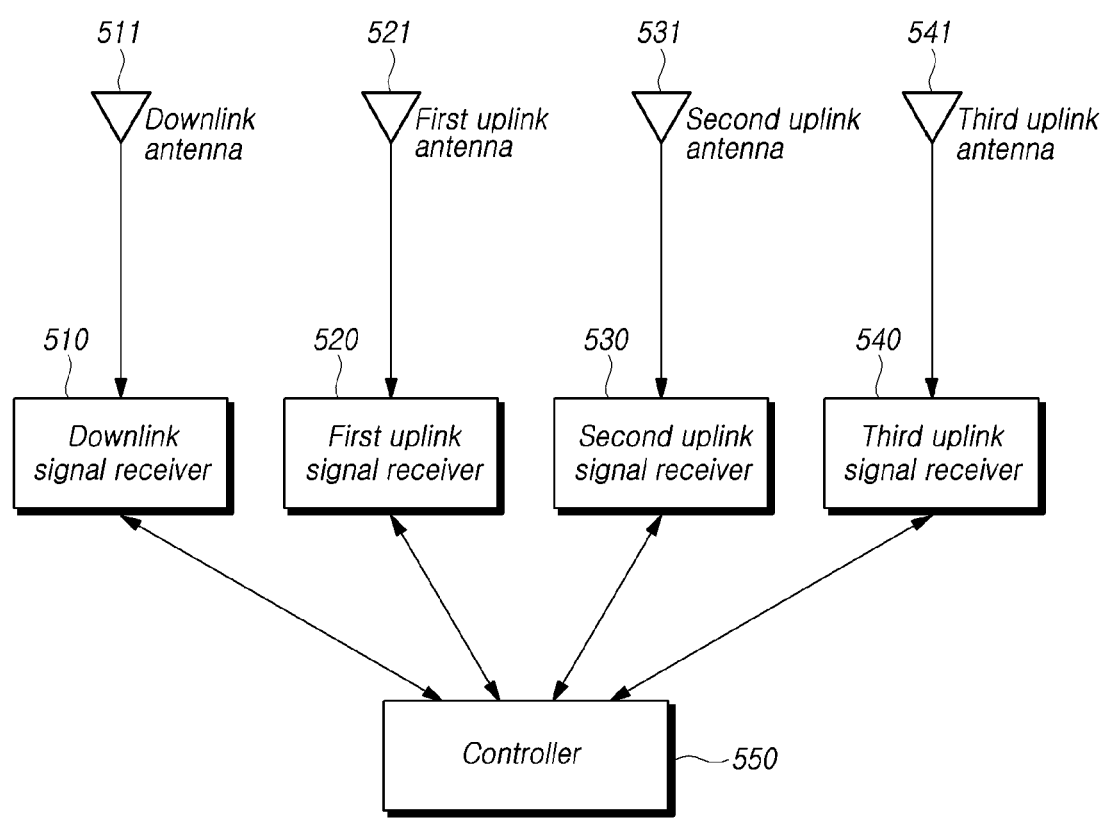
FIG. 5 illustrates a configuration of a signal measurement device according to further another aspect of the present disclosure.

FIG. 5 illustrates a configuration of a signal measurement device according to further another embodiment of the present disclosure.

Referring to FIG. 5, the signal measurement device of FIG. 5 may include one downlink signal receiver 510 and one or more uplink signal receivers (520, 530, 540). A DL antenna 511 may be connected with the downlink signal receiver 510. Further, a first UL antenna 521, a second UL antenna 531, and a third UL antenna 541 may be connected with a first uplink signal receiver 520, a second uplink signal receiver 530, and a third uplink signal receiver 540, respectively. In a manner similar to those of FIGS. 3 and 4, a controller 550 can control the downlink signal receiver 510 and each uplink signal receiver (520, 530, 540) to interoperate with each other.

The downlink signal receiver 510 of the signal measurement device may be installed at a location at which downlink may be received well in the vicinity of a base station.

One or more uplink signal receivers (520, 530, 540) can attempt, at respective locations, to receive an uplink signal transmitted by a terminal whose location is required to be measured to a base station. In this case, each uplink signal receiver may be connected with the controller, and be interoperable with the uplink signal receiver. Thus, each uplink signal receiver may operate by being associated with a downlink signal received via the downlink signal receiver.

The embodiments discussed above show that each of the downlink signal receiver and one or more uplink signal receivers is connected through a wired connection. However, all connections or a partial connection may be performed using a wireless link. In this case, communication between each receivers and the controller may be performed using a frequency different from frequencies used by the receivers of the present disclosure.

Meanwhile, although FIG. 5 illustrates that one downlink signal receiver and the plurality of uplink signal receivers are included in the signal measurement device, embodiments of the present disclosure are not limited thereto. For example, a plurality of downlink signal receivers may be included therein, and in this case, each downlink signal receiver may be located at a different location from one another. Further, each downlink receiver and each uplink receiver may be installed to have a 1:1 correspondence. In this case, uplink resource assignment information can be acquired through respective downlink receivers, and using this, corresponding uplink receivers can receive an uplink signal transmitted by a terminal. In another example, one or more downlink receivers and one or more uplink receivers may be implemented to have a many-to-one or one-to-many correspondence.

Figure 6:
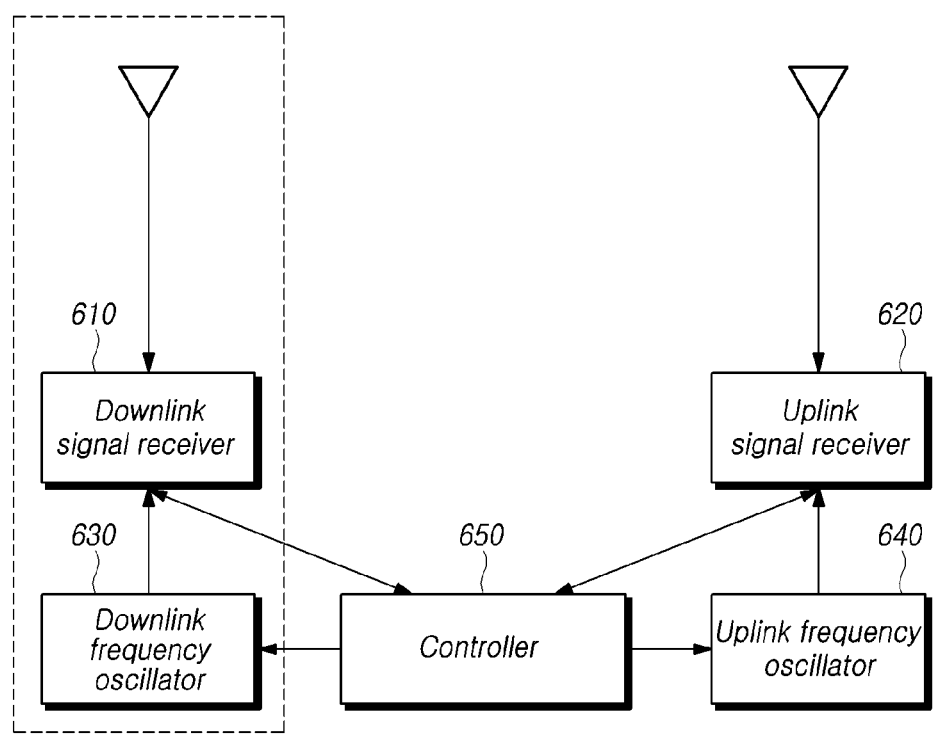
FIG. 6 illustrates a configuration of a signal measurement device according to an aspect of the present disclosure.

FIG. 6 illustrates a configuration of a signal measurement device according to an embodiment of the present disclosure.

Referring to FIG. 6, the signal measurement device of the present disclosure includes a downlink signal receiver 610, a downlink frequency oscillator 630, an uplink signal receiver 620, an uplink frequency oscillator 640, and a controller 650.

In the embodiment of FIG. 6, the downlink signal receiver 610 and the uplink signal receiver 620 are connected with respective antennas. In the signal measurement device of FIG. 6, the antennas used in the downlink signal receiver 610 and the uplink signal receiver 620 may be different from each other. That is, a DL antenna may be connected to the downlink signal receiver 610, and an UL antenna may be connected to the uplink signal receiver 620. However, the downlink signal receiver 610 and the uplink signal receiver 620 may share a single antenna, and in this case, can receive signals via the single antenna.

The downlink signal receiver 610 in the embodiment of FIG. 6 receives a downlink signal, and the controller 650 acquires resource assignment information for a corresponding frequency by processing the downlink signal. The resource assignment information may include RNTI information of the LTE system, resource information of uplink, and information on a modulation and coding scheme. In the embodiment of FIG. 6, the resource assignment information may be received through the downlink signal receiver 610.

The controller 650 can configure resource assignment of the uplink signal receiver 620 based on such information and then attempt to receive an uplink signal. When a value of the received uplink signal is greater than or equal to a pre-configured threshold value, or demodulation and/or decoding are successfully performed, the controller 650 can determine that a terminal with the RNTI is present. Further, an approximate distance from the device of the present disclosure can be calculated based on information on time latency of uplink, and an intensity, direction, time delay, and the like of the received signal.

The controller 650 can change an operation frequency as time passes. Specifically, the controller 650 can collect frequency information on multiple bands by changing a frequency every a predefined period through the downlink frequency oscillator 630 and the uplink frequency oscillator 640.

In one embodiment, one or more downlink signal receivers 610 can receive a downlink signal at a first downlink frequency during a first time period, and the controller 650 can acquire uplink resource assignment information from the downlink signal at the first downlink frequency, and one or more uplink signal receivers 620 can receive an uplink signal based on the uplink resource assignment information at a first uplink frequency corresponding to the first downlink frequency during the first time period.

Further, after the first time period has passed, the one or more downlink signal receivers 610 can receive a downlink signal at a second downlink frequency different from the first downlink frequency during a second time period after the first time period, and the controller 650 can acquire uplink resource assignment information from the downlink signal at the second downlink frequency, and the one or more uplink signal receivers 620 can receive an uplink signal based on the uplink resource assignment information at a second uplink frequency corresponding to the second downlink frequency during the second time period.

According to this, the device of the present disclosure can collect information on a corresponding terminal using frequencies of multiple bands. In this case, the controller 650 can acquire information on a band in which a signal from the terminal is detected, an RNTI of the terminal, a detected time, a signal intensity, a time delay, and the like, and then store it in a storage device.

The controller 650 may configure a downlink frequency and an uplink frequency to have a relationship corresponding to each other in the FDD system. That is, if a terminal of a mobile communication system uses a first frequency in downlink, uplink is allowed to use a second frequency spaced apart by a predetermined interval from the first frequency. The controller 650 may configure the downlink frequency oscillator 630 and the uplink frequency oscillator 640 in such a manner that the frequencies are configured between the downlink and the uplink. For example, in the FDD mobile communication system, if an f1 is used as an uplink frequency, a corresponding downlink frequency becomes a f1+Δf. Thus, it is normal that an uplink frequency and a downlink frequency are configured to have such a predetermined frequency interval. Through such a configuration, uplink resource assignment information acquired through the downlink signal receiver may be configured to become information of an uplink frequency band that is required to acquire.

Figure 7:
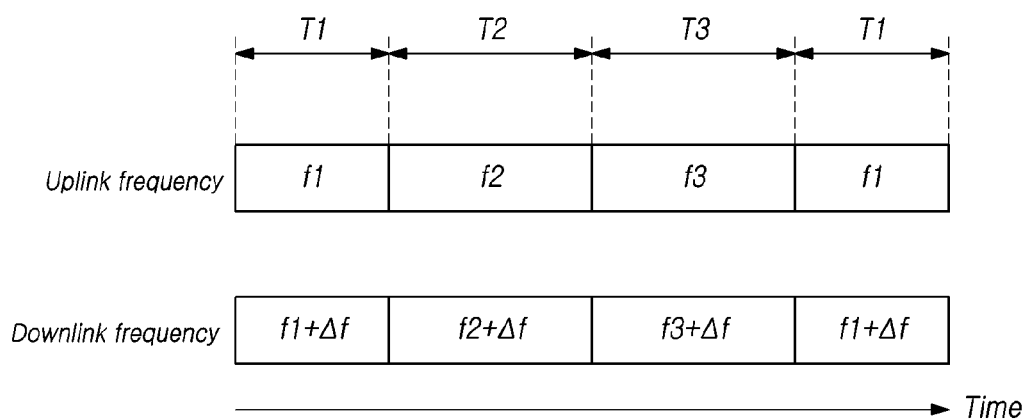
FIG. 7 illustrates a process in which a signal measurement device changes a frequency according to an aspect of the present disclosure.

FIG. 7 illustrates a process in which a signal measurement device changes a frequency according to an embodiment of the present disclosure. Discussions will be conducted on the process in which the device of the present disclosure configures an uplink frequency oscillator and a downlink frequency oscillator. In the embodiment of FIG. 7, a scenario is discussed in which the device of the present disclosure collects information on a terminal using 3 frequency bands. In this case, information on a terminal in each band can be collected by configuring a frequency during a predetermined period in each frequency band. When a predetermined time passes, information on a neighboring terminal can be collected by using a different uplink frequency in another band. At the same time, a downlink frequency can be changed to correspond to the uplink frequency. The collected information through this process may include a temporary ID in a base station such as an RNTI of the terminal, the presence or absence of the terminal, an intensity of a received signal, a time delay, or a time at which a signal from the terminal is detected.

The device of the present disclosure in the embodiment of FIG. 7 collects information on one or more neighboring terminals during a predetermined period T1 at the first frequency f1. Thereafter, the device of the present disclosure collects information on one or more neighboring terminals during a predetermined period T2 using a second frequency f2 that is different from the first frequency f1, and then, the second frequency f2 is changed to a third frequency f3 different from the first and second frequencies f1 and f2. At the third frequency f3, the device collects information on one or more neighboring terminals during a predetermined period T3. In this manner, the device of the present disclosure can operate during respective different periods in different frequency bands.

When power is turned on, the device of the present disclosure acquires information of an associated mobile communication system by scanning a frequency band used in the system. This process can include searching a synchronization channel transmitted from an associated base station by changing to one or more other frequencies. When the synchronization channel is searched, the device receives system information of the searched base station. In the case of the LTE, such system information may include dynamic system information transmitted from a BCH and a PDSCH. The system information acquired through this process may be stored in a storage device for each frequency band. The reason for storing the system information is to acquire information for neighboring terminals more quickly by using the stored system information when the corresponding frequencies are re-used later. Further, since the system information can be differently configured for each service provider and each frequency band, it is desirable to store the system information for each frequency band. In the process of acquiring such initial system information, the device of the present disclosure can acquire frequency information of a band which can be scanned by the device and system information.

After acquiring the system information through this process, the device of the present disclosure collects information on a neighboring terminal in each band. When the device of the present disclosure tunes to a new frequency after acquiring the system information at the initial stage, the device can collect information on the neighboring terminal by using information on a band of the new frequency among the stored system information.

The device of the present disclosure can receive uplink resource assignment information based on the system information in one frequency band. This process may be performed by the downlink signal receiver of the device of the present disclosure. When the uplink resource assignment information is received, the device of the present disclosure identifies whether a signal transmission is performed on the uplink resource. The uplink resource assignment information needed to perform this process may include information on an RNTI of the terminal, a frequency resource, a modulation and coding scheme of a transmitted signal, and the like. Information on a location of a terminal can be acquired using the presence or absence of the terminal of the RNTI, a time delay, an intensity of a received signal, and the like based on the uplink resource assignment information. The information of the searched frequency band may be stored together with the RNTI of the searched terminal, the intensity of the signal, the time delay, or a time at which the signal has been detected. The stored information may be used as several usages by the device of the present disclosure, and be further transmitted to one or more neighboring devices for enabling them to use it. Discussions have been conducted on the embodiments in which resource assignment information on uplink is received via the downlink signal receiver; however, embodiments of the present disclosure are not limited thereto. For example, resource assignment information on uplink may be received via a communication channel from a corresponding mobile communication network. Further, one or more additional downlink receivers may be installed in the vicinity of a base station, and resource assignment information on uplink may be received through communication channels via these receivers. This communication channel may be implemented wirelessly or through a wired connection.

At the same time, system information transmitted by a base station may be received in each frequency band. Since the base station may change a configuration of a corresponding system when needed, it is necessary to receive information of the system, and thereafter update it continuously. The updated system information may be stored for each frequency band, and when the corresponding frequency is reused, be utilized to save time required in a process of receiving this system information at an initial stage.

Figure 8:
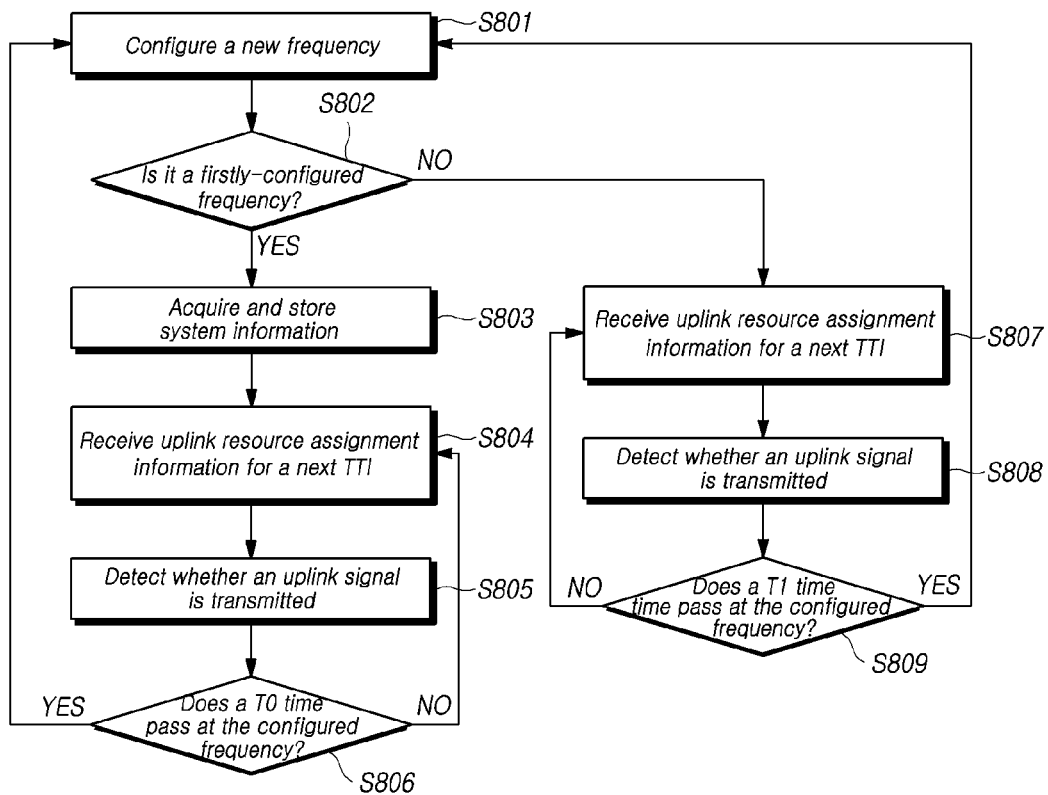
FIG. 8 is a flow chart illustrating that a signal measurement device changes a frequency according to an aspect of the present disclosure.

FIG. 8 is a flow chart illustrating that a signal measurement device changes a frequency according to an aspect of the present disclosure.

Referring to FIG. 8, the device of the present disclosure selects a new frequency for operation, at step S801. Further, the device searches information on a terminal in the vicinity of the device in a corresponding band of the selected frequency. When the device of the present disclosure starts a search in the configured frequency band, it is needed to identify whether the frequency band is a firstly-configured frequency band or not, at step S802. In this case, a period needed for information collection in a frequency band may be differently set according to whether the frequency band is firstly configured or re-configured. In the embodiment of FIG. 8, if the frequency band is firstly configured, the device of the present disclosure operates at the frequency band during a T0 period, and if the frequency band is not firstly configured, that is, when the frequency band is re-configured, it operates at the frequency band during a T1 period. The reason for setting different periods in these cases is that if a frequency band is firstly configured, since a longer period is needed to collect system information, considering this, the device of the present disclosure is therefore required to operate at the frequency band during a relative long period. As described above, FIG. 8 illustrates the embodiment in which the device of the present disclosure is allowed to operate during a longer period at the frequency that is in the firstly-configured frequency band to acquire system information at an initial stage; however, embodiments of the present disclosure are not limited thereto. For example, when system information is required to be updated due to a change in system information after the initial stage, the device of the present disclosure may be also allowed to operate during a longer period.

If the frequency band in which the device of the present disclosure operates is firstly configured, the device of the present disclosure acquires system information for this frequency band, at step S803. For example, the device of the present disclosure can acquire the system information by receiving a forward channel (downlink). In the case of the LTE system, the device of the present disclosure acquires the system information by receiving dynamic system information transmitted through a BCH and a PDSCH. When the system information is acquired, the device of the present disclosure stores the acquired system information in a storage device, and collects information on a neighboring terminal in the frequency band, at step S804. Specifically, the device of the present disclosure receives uplink resource assignment information for the frequency band. After receiving the uplink resource assignment information based on the information collected for the neighboring terminal, the device of the present disclosure detects a signal transmission of the terminal for an uplink signal corresponding to this, at step S805. In this process, the device of the present disclosure can measure the presence or absence of the uplink signal, a time delay, a reception intensity, and the like. In this process, the reception of the uplink resource assignment information may be performed by receiving a downlink signal of an associated mobile communication system. Further, the device of the present disclosure determines whether a T0 period set for the frequency band passes, at step S806. When the T0 period set for the frequency band has not passed yet, the device of the present disclosure detects an uplink signal transmission by acquiring uplink resource assignment information for a next TTI. When the T0 period set for the frequency band has passed, the selected frequency at which the device of the present disclosure operates is changed to a new frequency, at step S801.

If a band of the new frequency is a re-configured frequency band or the new frequency is a re-configured frequency, in the device of the present disclosure, the device reads the system information stored in the storage device, and performs an information collection first for a neighboring terminal according to the stored system information, at step S807. Specifically, the device of the present disclosure receives uplink resource assignment information for the frequency band. After receiving uplink resource assignment information based on information collected for a neighboring terminal, the device of the present disclosure detects a signal transmission of the terminal for an uplink signal corresponding to this, at step S808. Further, the device of the present disclosure determines whether a T1 period set for the frequency band passes, at step S809. When the T1 period set for the frequency band has not passed yet, the device of the present disclosure detects an uplink signal transmission by acquiring uplink resource assignment information at a next TTI. When the T1 period set for the frequency band has passed, the selected frequency at which the device of the present disclosure operates is changed to a new frequency, at step S801.

In the process of performing the information collection for the neighboring terminal, when it is detected that system information is changed, the device of the present disclosure can receive the changed system information and store it in the storage device. In this case, the present disclosure can be reconfigured according to the system information. In some embodiments, when it is detected that system information is changed, the device of the present disclosure can receive information on a neighboring terminal at the corresponding frequency during a period longer than the T1 period set in FIG. 8.

The signal measurement device of the present disclosure can determine what control information is transmitted from a base station to the terminal by receiving a forward signal, i.e. a downlink signal. In particular, by receiving control information connected with a radio network temporary identifier (RNTI) via a downlink signal receiver, the signal measurement device of the present disclosure can determine whether an uplink signal may be transmitted, that is, whether the terminal may transmit the uplink signal to the base station based on the control information thereafter.

The RNTI is used as a temporary ID of a terminal in a base station, and since information on which RNTI is assigned to a terminal is not provided, its anonymity can be maintained. Herein, the RNTI is employed for the purposed of identifying a terminal; however, embodiments of the present disclosure are not limited thereto. Herein, it should be noted that any ID temporarily assigned to a terminal in one base station or cell may be used for the same purpose or function as the RNTI.

That is, instead of measuring location information for arbitrary one or more terminals, the device of the present disclosure can receive control information connected with a specific RNTI for measuring location information of only a terminal identified with a specific RNTI. When the RNTI is used as identification information of a terminal, there is produced an advantage of enabling a terminal whose location information is required to be measured at a specific time to be specified without leaking personal information of a user (e.g. a phone number, a name, a serial number).

In embodiments of the present disclosure, there are provided methods of acquiring information on a terminal including the presence or absence of a terminal, a location of the terminal, and the like based on the RNTI information. In the present disclosure, it is necessary to perform reception and demodulation for a downlink channel in order to acquire control information including uplink resource assignment transmitted on downlink. In the present disclosure, methods of receiving downlink control information are discussed.

In one embodiment, demodulation and decoding for unspecified multiple RNTIs may be performed. That is, since information on which RNTI is assigned to a terminal is not provided, demodulation and decoding for all probable control information may be performed. In the LTE system, one or more candidates of a location at which control information can be transmitted for each terminal are defined. Each terminal can acquire control information through blind search for the candidates. That is, in the case of receiving control information for RNTIs of unspecified multiple terminals, the signal measurement device of the present disclosure may perform receptions for all probabilities that control information may be transmitted to terminals in a corresponding cell. In this process, the device of the present disclosure can select control information with high reliability among control information received on downlink, and derive RNTI information and additional control information through the received control information with high reliability.

As described above, the complexity of the device of the present disclosure may increase when attempting to receive all probable control information connected with RNTIs of unspecified multiple terminals. To reduce such complexity, demodulation and decoding may be performed for only one or more of candidate downlink channels for receiving control information.

Further, the device of the present disclosure may receive downlink control information for only a limited number of RNTIs. That is, the device may set a limited number of candidate RNTIs in advance, and then attempt to receive downlink control information on these candidates. That is, the device may set one or more candidate RNTIs in advance, and then attempt to receive forward control information on these.

In this process, the candidate RNTIs required to be received for downlink control information may be selected in various methods. In one example, a base station may inform the device of the present disclosure of one or more candidates. In another example, one or more candidates may be input to the device of the present disclosure from the outside thereof, or be informed through one or more different communication channel(s). In further another example, one or more candidate RNTIs may be defined in advance, and information collection may be performed for only such limited candidate RNTIs. For example, RNTIs may be assigned to specific types of terminals in advance, and based on this, downlink control information on these may be received. In this case, the device of the present disclosure can share information of the RNTIs assigned to these specific terminals with a base station in advance, or receive them from the base station for corresponding operations. Through such methods, without receiving downlink control information for all RNTIs, by attempting to receive control information for a limited number of RNTIs, the complexity of corresponding operation may be reduced, or reliability of receiving downlink control information may be increased.

Based on this, the device of the present disclosure can acquire information on when an uplink signal may be transmitted and which resource the uplink signal may be transmitted over. The device of the present disclosure can attempt to receive an uplink signal transmitted by a terminal to a base station based on uplink resource assignment information acquired through such operation, and determine whether the uplink signal is transmitted based on a result obtained by attempting to receive the uplink signal. In this case, this determination may be performed by the controller 550.

If for a time period at which, or a frequency resource on which, it is indicated that an uplink signal is transmitted in control information, the transmission of data for the uplink signal from a terminal to a base station is detected through an uplink signal receiver, the device of the present disclosure may determine that the terminal whose location is required to be measured is placed at a location in the vicinity of the uplink signal receiver. Further, based on this, the device of the present disclosure can acquire information on the terminal including the presence or absence of the terminal, a location of the terminal, and the mobility of the terminal.

Figure 9:
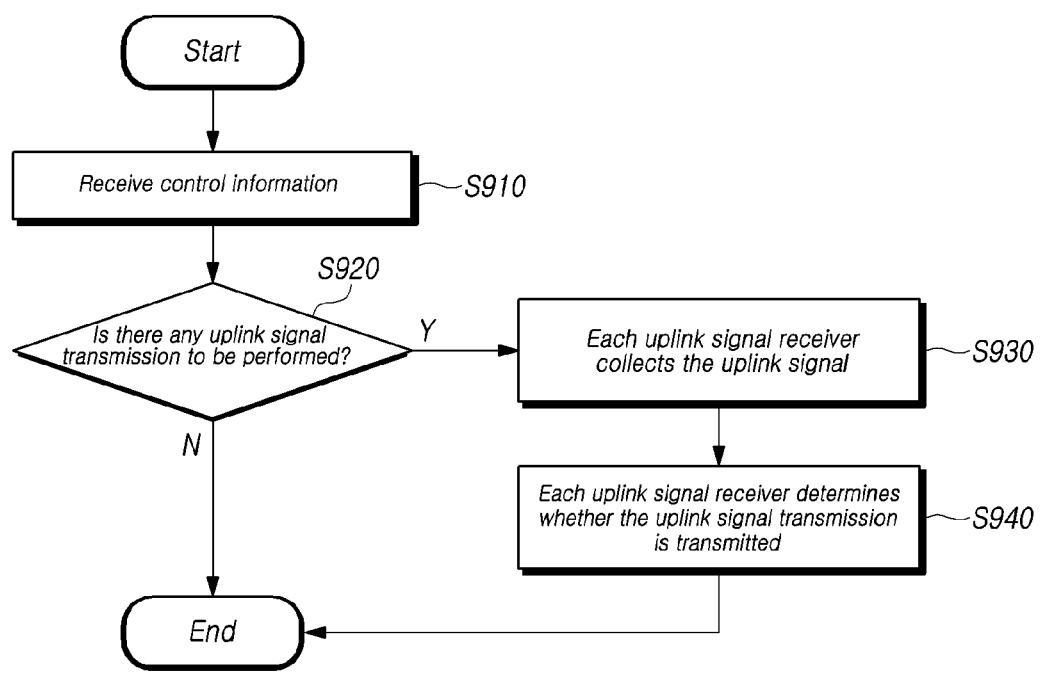
FIG. 9 is a flow chart illustrating that a signal measurement device receives an uplink signal according to an aspect of the present disclosure.

FIG. 9 is a flow chart illustrating that a signal measurement device receives an uplink signal according to an embodiment of the present disclosure.

In FIG. 9, the operation of the communication device is discussed based on the LTE system as one example of mobile communication systems. The LTE system operates based on a TTI of 1 ms, and forward control information may be transmitted from a base station to a terminal for each TTI. Meanwhile, the procedure discussed below can be equally applicable to mobile communication systems other than the LTE system.

The device of the present disclosure can receive control information transmitted from a base station to a terminal, at step S910.

The terminal can demodulate and decode one or more downlink signals for each TTI. At this time, the downlink signal received by the terminal from the base station may be a control channel such as a PDCCH or a data channel such as a PDSCH. That is, in the LTE, control information may be normally transmitted through the PDCCH, and when the control information is transmitted through the PDSCH, the PDSCH may be received. In this case, the device of the present disclosure may receive a PDCCH of downlink first, and thereafter attempt to receive a PDSCH based on the control information.

The device of the present disclosure can receive a forward signal transmitted from the base station to the terminal, that is, a downlink signal, and thereafter, identify when an uplink may be transmitted and which resource the uplink may be transmitted over, and which RNTI the terminal has at that time.

Whether an uplink signal that may be transmitted through each uplink signal receiver for the uplink resource identified through this process is present may be identified, at step S920. This process may include to determine whether a terminal that may transmit an uplink is present, and which RNTI the terminal has, through control information transmitted on downlink. That is, when it is determined that an uplink signal transmission may be performed through uplink resource assignment information acquired by each downlink signal receiver, an uplink signal transmitted to a base station through the uplink resource can be collected, and based on the collected uplink signal, whether the uplink signal is transmitted can be determined. In this process, the uplink resource assignment information may be acquired by receiving a PDCCH which is control information transmitted on downlink.

When it is determined that an uplink signal transmission may be performed, at step S920-Y, each of one or more uplink signal receivers included in the device of the present disclosure can collect an uplink signal, and attempt to receive the uplink signal, at step S930.

Further, the device of the present disclosure can determine whether an uplink signal is transmitted through each uplink signal receiver, at step S940.

On the contrary, when it is determined that an uplink signal transmission may not be performed, at step S920-N, the device waits until next control information is received without performing a separate uplink signal collecting operation.

This operation may be performed continuously for each TTI. Further, the device of the present disclosure can identify whether a terminal is placed, a location of the terminal, and mobility information thereof based on the presence or absence of the uplink signal transmission, which is determined based on the signal collected by each uplink signal receiver.

The above process may be performed based on information on an RNTI of a terminal. That is, the device of the present disclosure can determine whether an uplink signal transmitted only from a terminal having a specific RNTI is transmitted, and identify the presence or absence of the terminal having the specific RNTI, a location of the terminal, and mobility information of the terminal.

Figure 10:
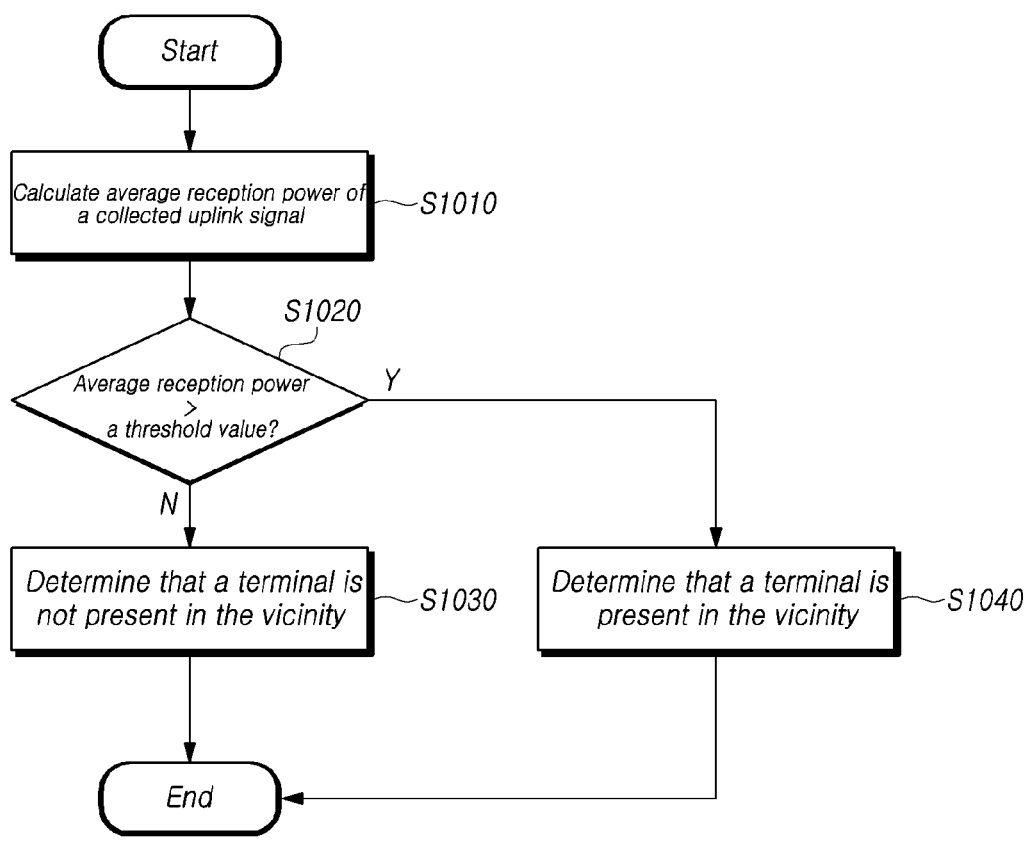
FIG. 10 is a flow chart illustrating that a signal measurement device detects the present disclosure of a terminal based on an uplink signal according to an aspect of the present disclosure.

FIG. 10 is a flow chart illustrating that a signal measurement device detects the existence of a terminal based on an uplink signal according to an embodiment of the present disclosure.

Referring to FIG. 10, the device of the present disclosure can acquire transmission information of uplink from a reception signal of downlink acquired through a downlink signal receiver. Thereafter, based on the acquired uplink transmission information, the device of the present disclosure can collect an uplink signal transmitted from a terminal to a base station through a resource assigned on uplink, and calculate average reception power of the collected signal, at step S1010.

The device of the present disclosure can compare a calculated average reception power value with a threshold value calculated or set in advance, at step S1020. When the average reception power value is greater than the threshold value through the comparing, at step S1020-Y, since the uplink signal has been received, it can be determined that a terminal whose location is required to be measured is placed in the vicinity of the device, at step S1040. On the contrary, when the average reception power value is smaller than the threshold value, at step S1020-N, since the uplink signal is not received, it can be determined that a terminal whose location is required to be measured is not placed in the vicinity of the device, at step S1030.

In the above process, power of a reference signal which is a pilot signal transmitted over uplink PUCCH or PUSCH may be used for calculating a reception power value of the uplink. In another example, power of a data signal transmitted over uplink PUCCH or PUSCH may be used for calculating a reception power value of the uplink. Further, it is possible to identify the presence or absence of a terminal and information on a location of the terminal by combining power values of the reference signal and the data signal. In further another example, the presence or absence of a terminal may be determined through whether demodulating and decoding an uplink PUCCH are successfully performed.

In the present disclosure, a device is provided that includes a downlink signal receiver and one or more uplink signal receivers, determines the presence or absence of a terminal and information on a location thereof by acquiring uplink resource assignment information through control information received by the downlink signal receiver, and based on this, determines whether an uplink signal transmitted from the terminal to a base station is present.

Based on this, the device of the present disclosure can acquire the presence or absence of a terminal whose location is required to be measured, a location of the terminal, mobility information thereof, and the like. Further, this process may be performed without affecting existing communication networks at all.

The device of the present disclosure can serve to measure mobility information of a terminal. The mobility denotes measuring a time taken for a terminal to move between two or more locations, and based on this, acquiring information on traffic information, a moving speed of the terminal, a moving path, and the like. In this process, the movement information of a terminal may be acquired using one signal measurement device, or a plurality of signal measurement devices for increased efficiency.

Figure 11:
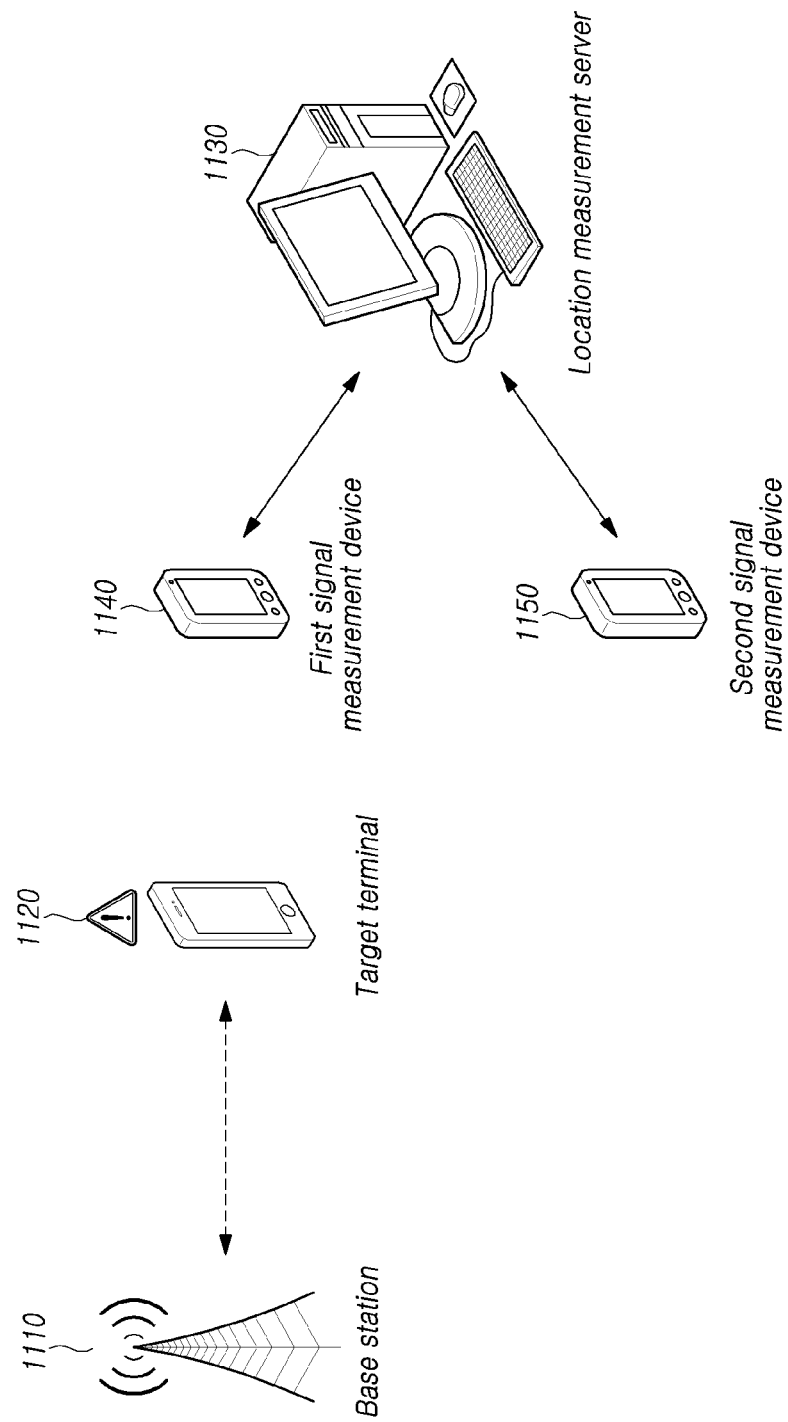
FIG. 11 illustrates a signal measurement system according to an aspect of the present disclosure.

FIG. 11 illustrates a signal measurement system according to an embodiment of the present disclosure. The signal measurement system shown in FIG. 11 may include a base station, a terminal, one or more signal measurement devices of the present disclosure, and a location measurement server.

Each of a first signal measurement device 1140 and a second signal measurement device 1150 included in the signal measurement system shown in FIG. 11 may be located in a different location from each other. Movement information of the terminal may be acquired using a plurality of signal measurement devices in FIG. 11. For example, it is assumed that a distance between two signal measurement devices 1140 and 1150 is d. If a terminal having any RNTI moves from a location at which the first signal measurement device 1140 is placed to a location at which the second signal measurement device 1150 is placed for a T1 time, it is possible to acquire information that it takes a T1 time to move between two locations. In another example, if a terminal is placed between two signal measurement devices 1140 and 1150, the signal measurement devices 1140 and 1150 can measure an uplink signal transmitted by the terminal. In this case, a location of the terminal may be measured based on measurements from two or more signal measurement devices, and based on these, the movement information of the terminal 1120 may be acquired. Here, each signal measurement device (1140, 1150) may transmit a measurement of the uplink signal from the terminal to the location measurement server 1130, and the location measurement server 1130 can measure a location of the terminal based on the received measurement. At this time, each signal measurement device (1140, 1150) may transmit, to the location measurement server 1130, measured RNTI information of the terminal, location information including a distance between the terminal and at least one of the signal measurement device (1140, 1150), and information including a measurement time etc.

In this process, if the terminal performs a handover, an RNTI used in a previous cell may be different from an RNTI to be used after the handover. In this case, the location measurement server 1130 can receive RNTI information from different cells. As a result, it may be difficult for the location measurement server 1130 to determine whether the information from the different cells is measurement information from an identical terminal, or measurement information from different terminals.

Further, an RNTI of a terminal may be changed in one cell due to a request of the terminal, an efficient operation of an associated system, and the like. Further, when the signal measurement device of the present disclosure performs measurement based on a PUCCH of uplink, or when a base station changes a configuration of the PUCCH, it may be difficult for the signal measurement device of the present disclosure to recognize such situations.

In the present disclosure, there is provided a method of enabling mobility measurement of a terminal when it is difficult to recognize whether the signal measurement device of the present disclosure performs measurement for an identical terminal or measurement for different terminals due to the changes of an RNTI and uplink transmission parameters by a base station, a handover of the terminal, or the like. In particular, when performing a handover, an RNTI and transmission parameters etc. in a cell before the handover may be different from those in a cell after the handover. In this case, a determination for whether the measurement performed by the signal measurement device of the present disclosure is for the identical terminal or the different terminals is very important for mobility determination. Therefore, according to embodiments of the present disclosure, a device is provided that determines the identity of a terminal when information for the terminal is changed. In the present disclosure, discussions are conducted taking account of a situation where a handover is performed. However, it should be noted that embodiments of the present disclosure may be equally applied to a situation where a base station changes an RNTI and transmission parameters in an identical cell.

In one embodiment, there is provided a method of analyzing a signal transmitted or received by the terminal in FIG. 11. In particular, the signal measurement device of the present disclosure can analyze a pattern of one or more downlink signals transmitted to the target terminal 1120 whose location is required to be measured, and analyze a pattern of one or more uplink signals transmitted by the target terminal 1120. For analyzing the uplink signal, the signal measurement device of the present disclosure can use all, or one or more, of a transmission period of a PUSCH as well as a PUCCH transmitted by the target terminal 1120, a transmission format on the PUCCH, transmission frequency of the PUSCH, an amount of data, and the like. Further, a pattern of one or more downlink signals transmitted to the target terminal 1120 can be analyzed. Based on these, it is possible to determine whether a terminal measured by the first signal measurement device 1140 and a terminal measured by the second signal measurement device 1150 are an identical terminal or different terminals. If it is determined that the terminal measured by the first signal measurement device 1140 and the terminal measured by the second signal measurement device 1150 are identical, a time taken to move between two points may be measured based on a movement distance and a movement time of the target terminal 1120 measured by two signal measurement devices.

However, in many situations, there may be several terminals provided with similar services from a mobile communication network. For example, there may be several terminals making voice calls. As a result, it may be difficult to determine whether the measured terminals are an identical terminal or different terminals by only analyzing a pattern of data of uplink/downlink. Therefore, when one terminal performs a handover, it is very important to acquire parameter information to be used by the terminal after the handover, together with an RNTI used before, and to be used after, the handover.

Figure 12:
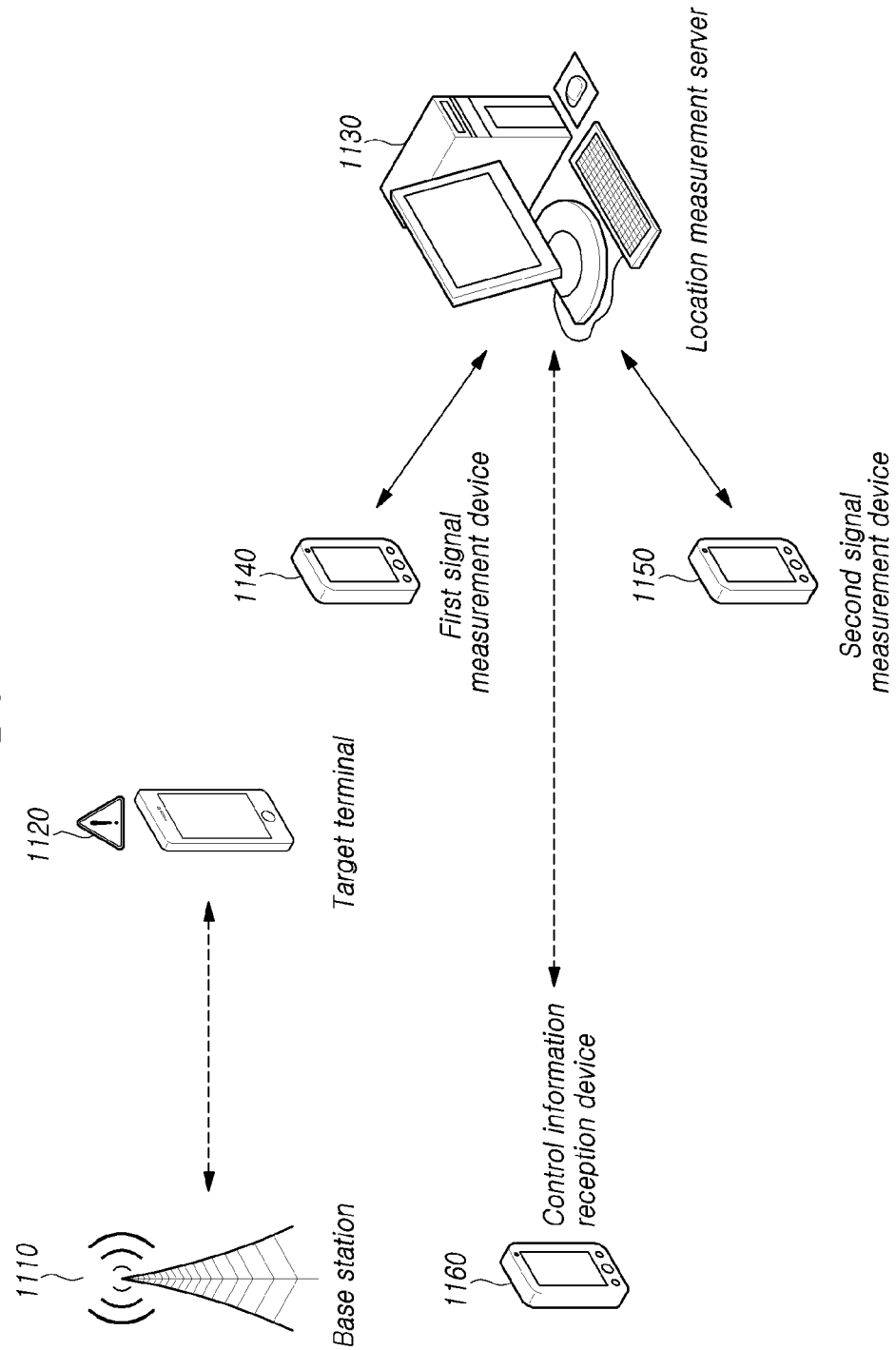
FIG. 12 illustrates a signal measurement system according to another aspect of the present disclosure.

FIG. 12 illustrates a signal measurement system according to another embodiment of the present disclosure. The signal measurement system shown in FIG. 12 may include a base station, a terminal, one or more signal measurement devices of the present disclosure, a control information reception device, and a location measurement server.

The control information reception device includes one or more downlink signal receivers receiving a downlink signal from the base station, a controller acquiring control information on the terminal based on the downlink signal, and a communication unit transmitting the control information on the terminal to the location measurement server. Here, the control information on the terminal may include at least one of call setting information of the terminal, parameter information used by the terminal, and handover control information. The configuration of the signal measurement device and related discussions conducted above may be referred to as a configuration of the control information reception device of the present disclosure and related discussions.

Referring to FIG. 12, the control information reception device 1160 for receiving call setting change and handover information may be placed in the vicinity of the base station 1110. When the base station 1110 sets a new call, changes a parameter of a set call, or indicates a handover, the base station 1110 wirelessly transmits a message to the terminal through downlink. The control information reception device 1160 for receiving this message may be installed in the vicinity of the base station, and thus, acquire this information. In one embodiment, the control information reception device 1160 may be installed so that reception power or a received signal-to-noise ratio (SNR) of a specific downlink channel received from the base station can be greater than or equal to a first threshold value. Specifically, the control information reception device 1160 can serve to receive control messages, such as, a new call setting, a main parameter change of a call, and a handover indication, among signals transmitted on downlink without receiving data of a user, and then transmit them to the location measurement server 1130.

The reason why the control information reception device 1160 is installed within a first distance from the base station is to ensure that reception performance of downlink is greater than or equal to a predetermined level. This is for the purpose of installing the control information reception device 1160 at a point at which reception power or a SNR of a specific channel transmitted from the base station is greater than or equal to the first threshold value. A pilot or reference signal transmitted from the base station may be used as the specific channel. In another example, a synchronization signal, a broadcasting channel (BCH), or the like transmitted on downlink may be used as the specific channel.

Information on the call setting change and the handover can be acquired by receiving a PDSCH in the LTE system. In this process, information on the process in which a terminal having a specific RNTI performs a handover may be acquired. Thus, the handover-related information can be acquired without infringing on the privacy of a user of the terminal. The base station 1110 can transmit such information to the terminal through the PDSCH, and the device of the present disclosure can acquire the information on the handover, and the like by receiving this. In this process, the handover information may include a cell ID of a base station, an RNTI, and cell setting information after the handover, as well as a cell ID of a base station, an RNTI, and cell setting information before the handover.

The location measurement server 1130 that has received the call setting change and handover information can determine whether measurement data transmitted by signal measurement devices are based on one or more signals transmitted from an identical terminal or different terminals based on the received information. Based on this, movement information of a terminal determined as the identical terminal can be calculated.

Figure 13:
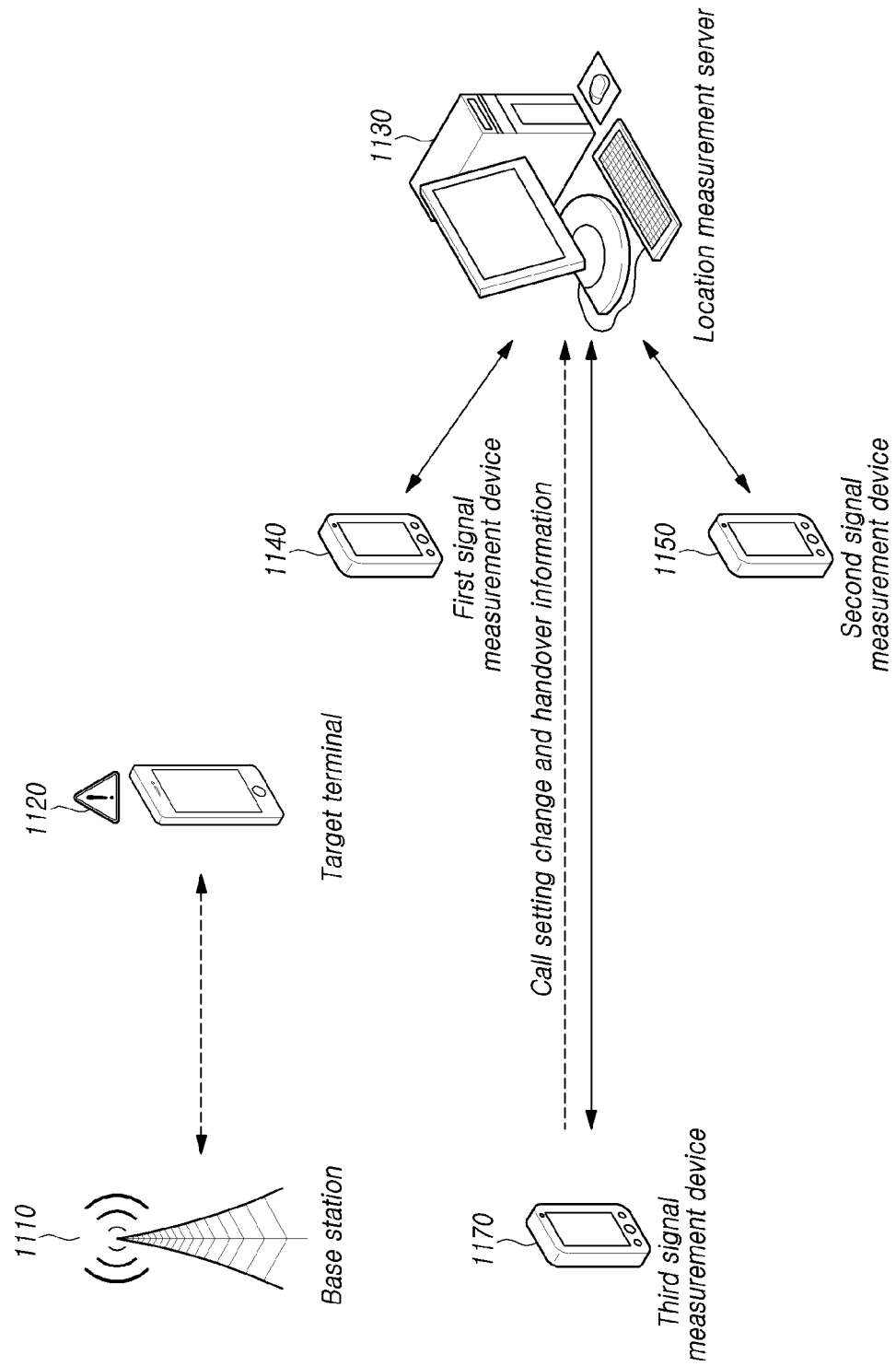
FIG. 13 illustrates a signal measurement system according to further another aspect of the present disclosure.

FIG. 13 illustrates a signal measurement system according to further another embodiment of the present disclosure. Referring to FIG. 13, one or more signal measurement devices may include a function of receiving information on a call setting change and a handover, by analyzing a forward channel. In other words, the functionality of the signal measurement device may be added to the control information reception device of FIG. 12, or the functionality of the control information reception device may be added to the signal measurement device. One or more signal measurement devices located in the vicinity of a base station may be configured to receive the information on a call setting change and a handover. For example, a third signal measurement device 1170 in FIG. 13 may be configured to receive control information including a call setting change, a handover, and the like from a base station. In this process, the handover information may include a cell ID of a base station, an RNTI, and cell setting information after the handover, as well as a cell ID of a base station, an RNTI, and cell setting information before the handover. Further, the call setting change may include a changed RNTI and a change in call setting related parameters. On the other hand, remaining signal measurement devices may be configured not to perform this operation. All signal measurement devices can serve to measure one or more unlike signals transmitted by one or more terminals, and transmit a location and mobility information to a location measurement server 1130. One or more signal measurement devices may additionally include a function of receiving information on a call setting and a handover. The location measurement server 1130 that has received the information can determine whether the measurement results are based on signals from an identical terminal or different terminals based on this, and then calculate a location and mobility based on this.

In the embodiment shown in FIG. 13, only one or more signal measurement devices can perform the function of receiving the information on a call setting and a handover transmitted by the base station. This may be implemented by allowing the signal measurement device to be additionally equipped with a device capable of acquiring information of downlink transmitted by the base station. That is, even when signals transmitted by terminals can be measured by using the signal measurement device as illustrated in the embodiment of FIG. 4, the signal measurement device capable of receiving the information on a call setting change and a handover is allowed to have an additional capacity of hardware and software to perform this function. That is, two types of signal measurement devices may be provided, such as, a first type of signal measurement device for measuring an uplink signal of a terminal, and in addition to this, a second type of signal measurement device capable of receiving control information including a call setting change, a handover, and the like transmitted by a base station. The first type of signal measurement device can transmit only measurement results of an uplink signal from a target terminal to the location measurement server 1130. However, the second type of signal measurement device can transmit the information on the call setting change and the handover, as well as the measurement results of an uplink signal from the terminal, to the location measurement server 1130. For implementing this configuration, a function for receiving and processing the information on the call setting change and the handover transmitted by the base station 1110 may be added to a downlink signal receiver and a controller.

Figure 14:
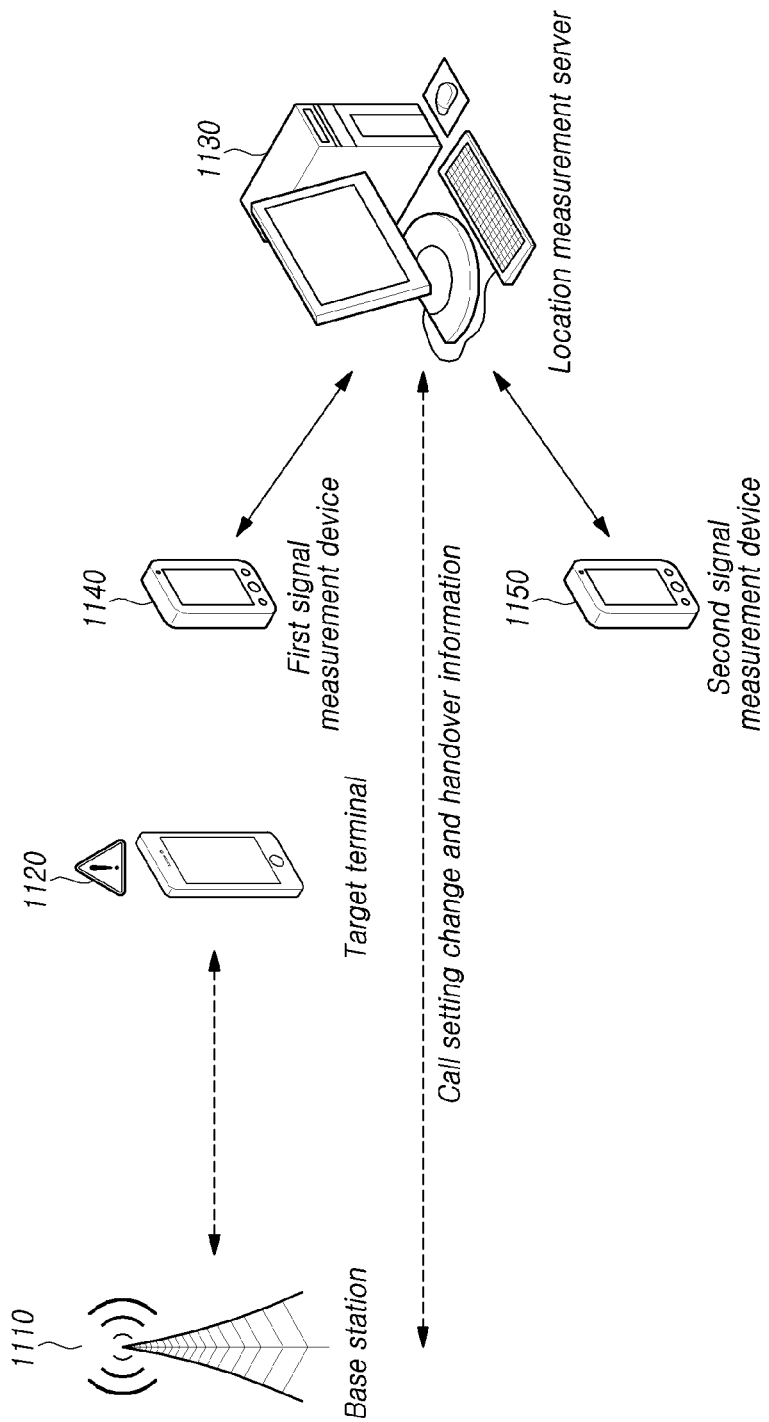
FIG. 14 illustrates a signal measurement system according to further yet another aspect of the present disclosure.

FIG. 14 illustrates a signal measurement system according to further yet another embodiment of the present disclosure. In this embodiment, the location measurement server 1130 may directly receive information on a call setting change and a handover from the base station 1110 or a mobile communication network, and based on this, recognize whether measurement data are based on signals from an identical terminal or different terminals. That is, in the embodiments in FIGS. 12 and 13, while a separate device is installed for receiving information on a call setting change and a handover transmitted on downlink by the base station 1110 to a terminal, and this information is acquired by the separate device, in the embodiment in FIG. 14, the location measurement server 1130 directly receives information on the call setting change and the handover from the base station 1110 or the mobile communication network. This information may be transmitted through a wired connection, or wirelessly transmitted. That is, according to this embodiment, the mobile communication network directly transmits this information to the location measurement server of the present disclosure.

In the embodiments of FIGS. 12 and 13, the control information reception device or the signal measurement device that receives information on a call setting change and a handover transmitted by the base station 1110 may be configured to receive a higher quality of downlink than one or more other signal measurement devices. Thus, acquiring control information on terminals through the control information reception device or the signal measurement device can enable more control information, such as uplink resource assignment information, with high reliability to be acquired. The uplink resource assignment information of terminals acquired in this manner may be transmitted to one or more signal measurement devices placed in an identical cell, and based on this, the signal measurement devices can measure one or more uplink signals from a terminal. In another embodiment, uplink resource assignment information of terminals acquired by each signal measurement device may be transmitted to the location measurement server, and the location measurement server can transmit all or a part of this information to each signal measurement device. The devices receiving the uplink resource assignment information from one or more other devices can attempt to detect uplink signals from the terminals based on such received uplink resource assignment information, and based on the detected signals, recognize the presence or absence of the terminal and location information. Further, the devices receiving the uplink resource assignment information from one or more other devices can combine uplink resource assignment information separately obtained by receiving one or more downlink signals and the uplink resource assignment information obtained from the other device(s), and based on this, detect an uplink signal from a terminal, and based on this, recognize the presence or absence of the terminal and location information.

Figure 15:
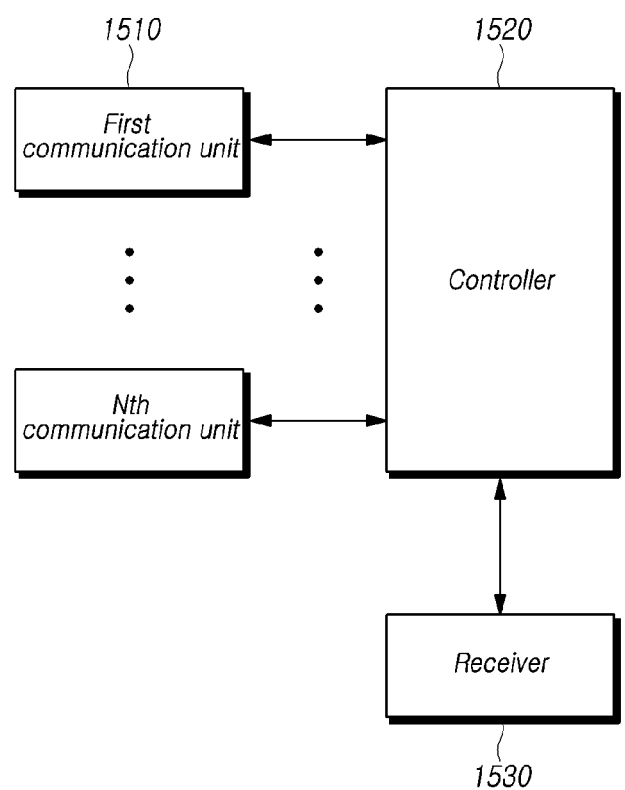
FIG. 15 illustrates a configuration of a location measurement server according to an aspect of the present disclosure.

FIG. 15 illustrates a configuration of a location measurement server according to an embodiment of the present disclosure.

The location measurement server acquires control information on a terminal, and includes a controller 1520 determining identifier information of the terminal based on the control information on the terminal. Further, the location measurement server may include a communication unit 1510 transmitting the identifier information of the terminal to one or more signal measurement devices. Here, the control information on the terminal may include at least one of call setting information of the terminal, information on a setting or change of parameters used by the terminal, and handover control information. An identifier of a terminal in the present disclosure may be an arbitrary identifier capable of guaranteeing the privacy of a user of the terminal whose identity cannot be recognized in actual, such as an RNTI.

In one embodiment, the location measurement server may further include a receiver 1530 receiving a signal including control information on a terminal from a signal measurement device. In this case, the controller 1520 can acquire control information on the terminal based on a signal received by the receiver.

In another embodiment, the location measurement server may further include a receiver 1530 receiving a signal including control information on a terminal from a base station. In this case, the controller 1520 can acquire control information on the terminal based on a signal received from the base station.

In one embodiment, the communication unit 1510 of the location measurement server may receive information on respective received uplink signals from one or more signal measurement devices. Here, the information on the uplink signal may include at least one of identifier information of a terminal that has transmitted the uplink signal, signal intensity information of the uplink signal, or information on a time at which the uplink signal is received.

When the communication unit 1510 receives measurement information for the uplink signal of the terminal from a signal measurement device, the controller 1520 can determine location information of the terminal and movement information based on control information on the terminal and information on the uplink signal. Further, the communication unit 1510 of the location measurement server may transmit the determined location information of the terminal and the movement information to one or more signal measurement devices.

Referring to FIG. 15, the location measurement server may include one or more communication units 1510 for performing communications with one or more signal measurement devices. The location measurement server can receive measurement information for an uplink signal from a terminal from one or more signal measurement devices via the communication unit 1510. Further, the location measurement server can transfer a command for controlling each signal measurement device.

Further, the location measurement server may include a receiver 1530 receiving information on a call setting change and a handover. Here, FIG. 15 illustrates that the communication unit performing communications with the signal measurement device and the receiver receiving information on a call setting change and a handover are separately configured; however, the communication unit and the receiver may be integrally configured or operated as one module. The location measurement server may include a function of receiving call settings of terminals and handover information from the device for collecting a call setting of a mobile communication system and handover information discussed in the embodiments of FIGS. 12, 13, and 14. Further, the controller of the location measurement server can analyze a location of the terminal and movement information using such information.

Figure 16:
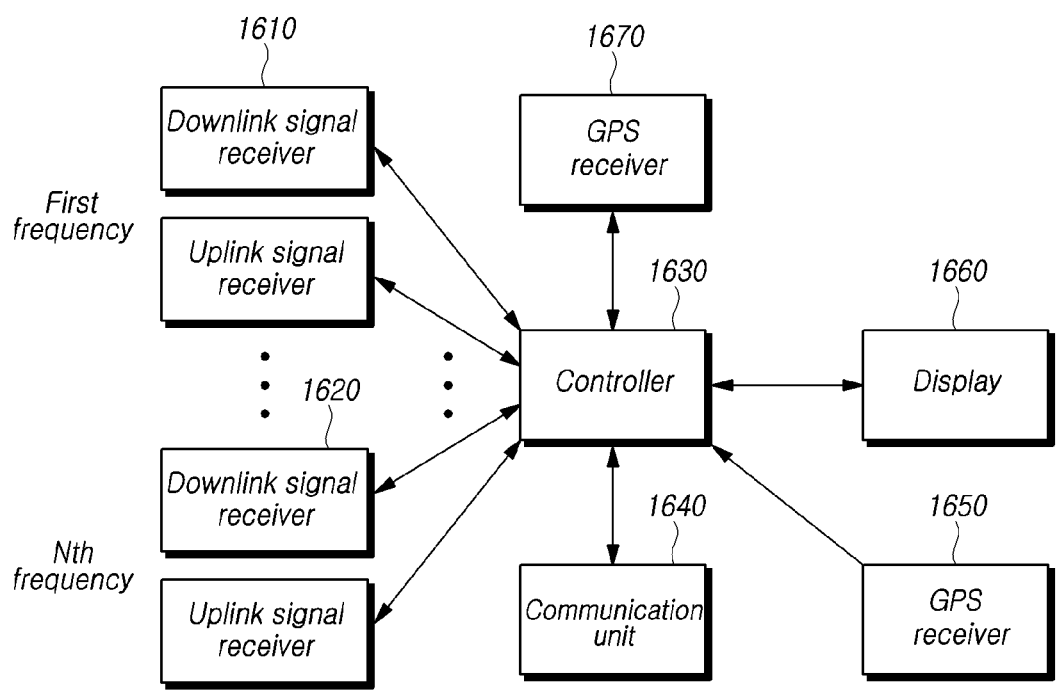
FIG. 16 illustrates a configuration of a signal measurement device according to an aspect of the present disclosure.

FIG. 16 illustrates a configuration of a signal measurement device according to an embodiment of the present disclosure. The device of FIG. 16 can substantially simultaneously measure uplink signals from terminals in a plurality of frequency bands using a plurality of downlink signal receivers 1610 and a plurality of uplink signal receivers 1620. That is, each downlink signal receiver and each uplink signal receiver may be configured to receive a signal in one frequency band.

Discussions on the controller 430, the communication unit 440, the input unit 450, and the display 460, and the GPS receiver 470 related to the embodiment of FIG. 4 may be referred to discussions related to a controller 1630, a communication unit 1640, an input unit 1650, a display 1660, and a GPS receiver 1670 included in the device of FIG. 16.

A plurality of devices of the present disclosure may be installed at several points, and according to this deployment, a network may be configured and used. In this case, each device may be configured to operate at an identical frequency. Specifically, a controller of the signal measurement device may synchronize a time and an operation frequency with one or more neighboring signal measurement devices placed within a second distance from the signal measurement device, and as time passes, change its operation frequency by being synchronized with the one or more neighboring signal measurement devices. For example, the controller can change an operation frequency of the signal measurement device to the same frequency, and/or at the same time, as the one or more neighboring signal measurement devices change.

Figure 17:
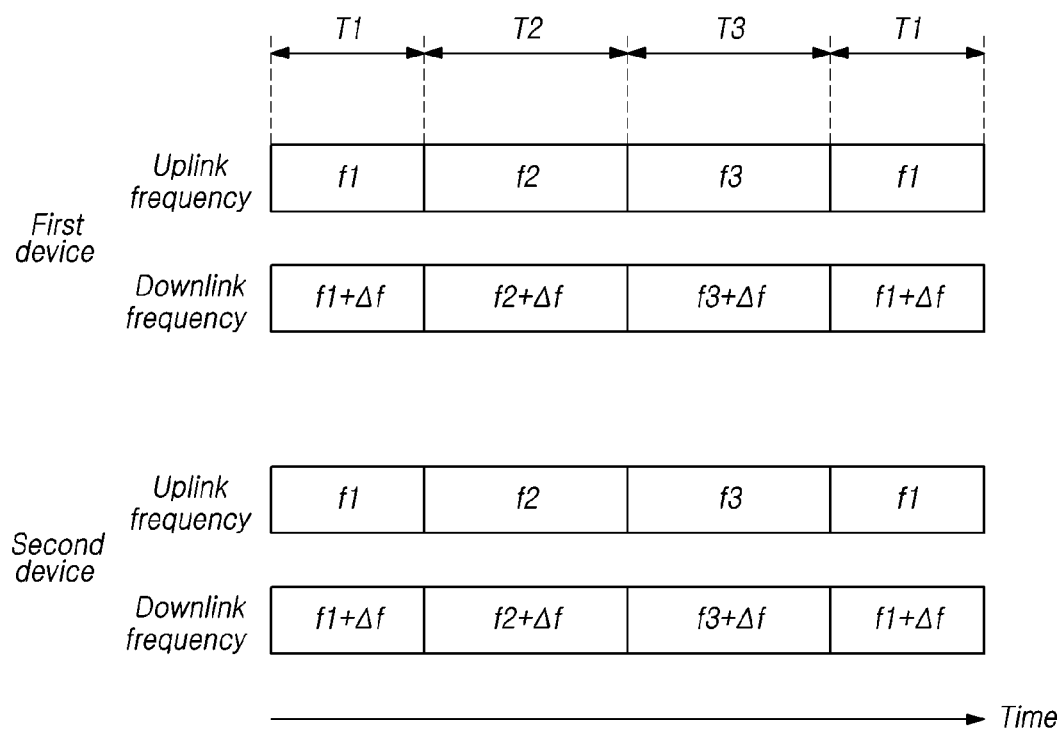
FIG. 17 illustrates a process in which multiple signal measurement devices operate in a synchronized frequency according to an aspect of the present disclosure.

The embodiment of FIG. 17 shows this configuration. Referring to the embodiment of FIG. 17, two signal measurement devices, i.e. a first device and a second device, can operate at the same time and at the same frequency. Further, when changing operation frequencies, the two devices can tune to the same frequency at the same time. The embodiment of FIG. 17 is illustrated based on an uplink frequency. However, devices of the present disclosure may be configured to tune to the same downlink frequency at the same time. Further, the embodiment of FIG. 17 illustrates a scenario in which two devices change their frequencies at the same time; however, two or more multiple devices can change their frequencies by synchronizing a frequency with one another.

As shown in the embodiment of FIG. 17, in order to operate at the same time at the same frequency, the devices of the present disclosure are required to be synchronized in time. In order to synchronize the devices in time, the devices of the present disclosure may use an external device such as GPS. Further, the synchronization may be performed based on a time transmitted from a mobile communication base station.

In the embodiment of FIG. 17, as a method of enabling several devices to operate at the same time at the same frequency, a time at which each device changes its frequency and a frequency to be changed may be defined in advance, and thus operation frequencies may be changed according to the predefined pattern. In another embodiment, one of the devices may instruct a frequency change to one or more other devices. Further, an external control device for controlling the several devices of the present disclosure may be provided, and it may instruct the devices of the present disclosure to change their frequencies.

In the embodiments of FIGS. 12 to 14, to acquire location measurements and mobility information of a terminal, it is necessary to acquire a call setting change and handover information from a mobile communication network. However, acquiring this information may be not easy in practice or require excessive cost.

In the present disclosure, a method is provided for acquiring a location of a terminal and mobility information even when it is not easy to acquire a call setting change and handover information from a mobile communication network.

Figure 18:
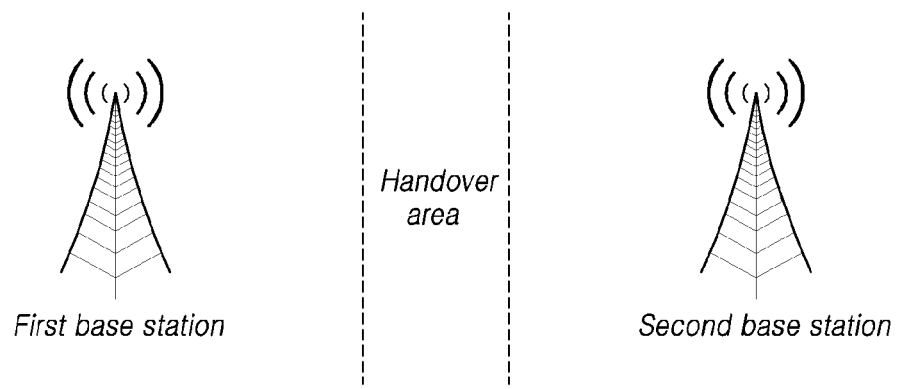
FIG. 18 illustrates a handover area of a mobile communication system.

FIG. 18 illustrates a handover area of a mobile communication system. In a situation where a first base station and a second base station are present, a terminal performs a handover while moving between the base stations. An area in which the handover is performed is called a handover area. When performing the handover, a transmission configuration including an RNTI used in a previous cell may be changed in a new cell. Therefore, it may be difficult to determine whether measurement results by a signal measurement device are based on an identical terminal or different terminals.

Figure 19:
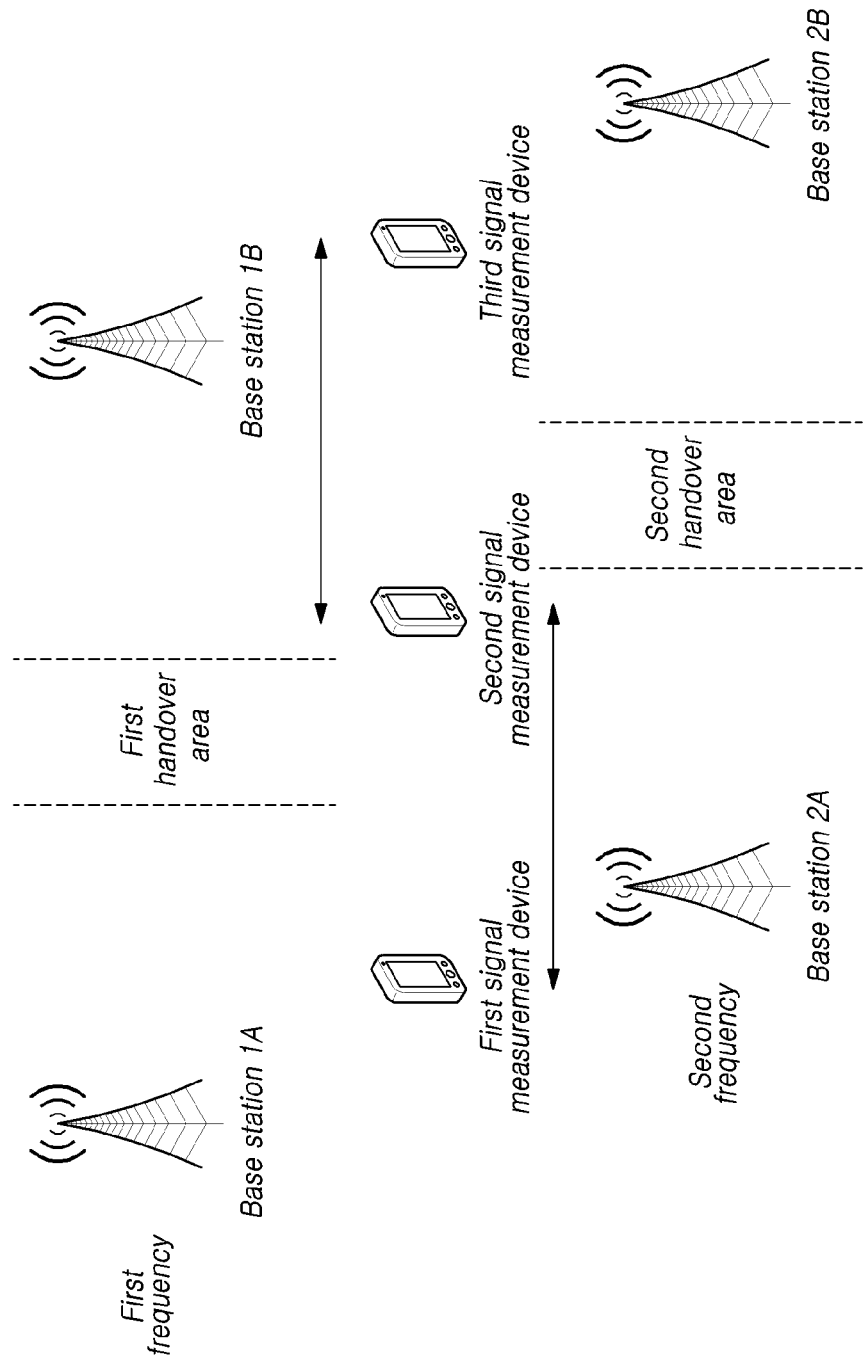
FIG. 19 illustrates a process of acquiring movement information of a terminal by using different bands in a signal measurement system according to aspects of the present disclosure.

FIG. 19 illustrates a method of measuring a location of one or more terminals and mobility according to an embodiment of the present disclosure. Referring to FIG. 19, it is assumed that the signal measurement device shown in FIG. 16 that is capable of receiving mobile communication signals in several frequency bands is used. As shown in FIG. 16, a frequency of each signal measurement device can be configured to receive signals from respective terminals using frequencies of different service providers. Here, the frequencies of different service providers may be characterized by a situation where respective base stations are placed at different points from each other. As shown in FIG. 19, respective base stations providing different frequencies may be located at different points from each other. When locations of the base stations are different, corresponding handover areas may be different. Using this situation, a method can be provided for acquiring movement information of a terminal. As shown in FIG. 19, movement information of a terminal using a second frequency being placed between a first signal measurement device and a second signal measurement device can be acquired using the first and second signal measurement devices. Further, movement information of a terminal using a first frequency being placed between the second signal measurement device and a third signal measurement device can be acquired using the second and third signal measurement devices. If movement information of respective terminals using different frequencies provided by different service providers can be acquired, it is possible to acquire more movement information by acquiring, through complementing each other, movement information that may not be acquired in a situation where one frequency is used for collecting movement information. In the embodiment of FIG. 19, by synthesizing the movement information of different frequencies, overall movement information of one or more terminals can be acquired.

Figure 20:
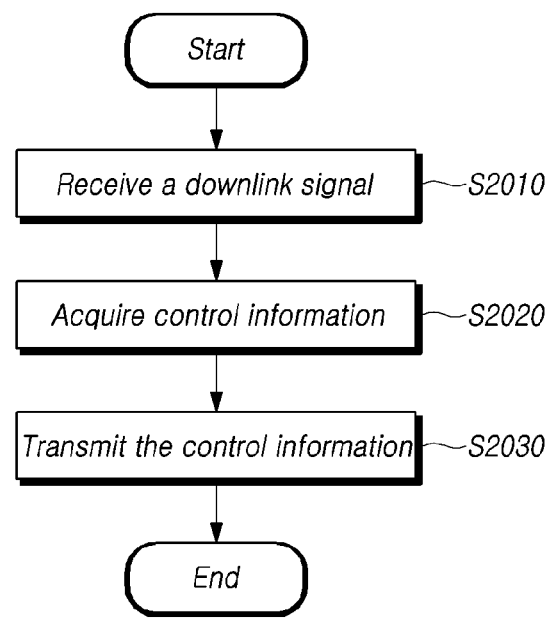
FIG. 20 is a flow diagram illustrating a control information reception method according to an aspect of the present disclosure.

FIG. 20 is a flow diagram illustrating a location measurement method according to an embodiment of the present disclosure.

Referring to FIG. 20, the location measurement method according to the embodiment of the present disclosure includes a signal reception step S2010 of receiving a downlink signal from a base station, a control information acquisition step S2020 of acquiring control information on a terminal based on the downlink signal, and a control information transmission step S2030 of transmitting the control information on the terminal to a location measurement server. Here, the control information on the terminal may include at least one of call setting information of the terminal, parameter information used by the terminal, and handover control information.

In one embodiment, a signal measurement device can determine the information on the terminal by receiving an uplink signal from the terminal, as well as acquiring the control information. Specifically, the signal measurement device can perform a step of acquiring uplink resource assignment information on the terminal, receiving an uplink signal from the terminal using an uplink signal receiver based on the uplink resource assignment information, and determining information on the terminal has transmitted the uplink signal based on the uplink signal. Here, the information on the terminal may include location information of the terminal. Further, the signal measurement device can acquire the uplink resource assignment information by receiving a downlink signal and then processing this.

Further, the signal measurement device can receive a downlink signal at a first downlink frequency during a first time period, acquire uplink resource assignment information from the downlink signal at the first downlink frequency, and receive an uplink signal based on the uplink resource assignment information at a first uplink frequency corresponding to the first downlink frequency during the first time period.

Further, after the first time period has passed, the signal measurement device can receive a downlink signal at a second downlink frequency different from the first downlink frequency during a second time period following the first time period, acquire uplink resource assignment information from the downlink signal at the second downlink frequency, and receive an uplink signal based on the uplink resource assignment information at a second uplink frequency corresponding to the second downlink frequency during the second time period following the first time period.

In this case, the signal measurement device may synchronize a time and an operation frequency with one or more neighboring signal measurement devices placed within a second distance from the signal measurement device, and as time passes, change its operation frequency by being synchronized with the one or more neighboring signal measurement devices. For example, the signal measurement device can change to the same frequency, and/or at the same time, as the one or more neighboring signal measurement devices change.

Figure 21:
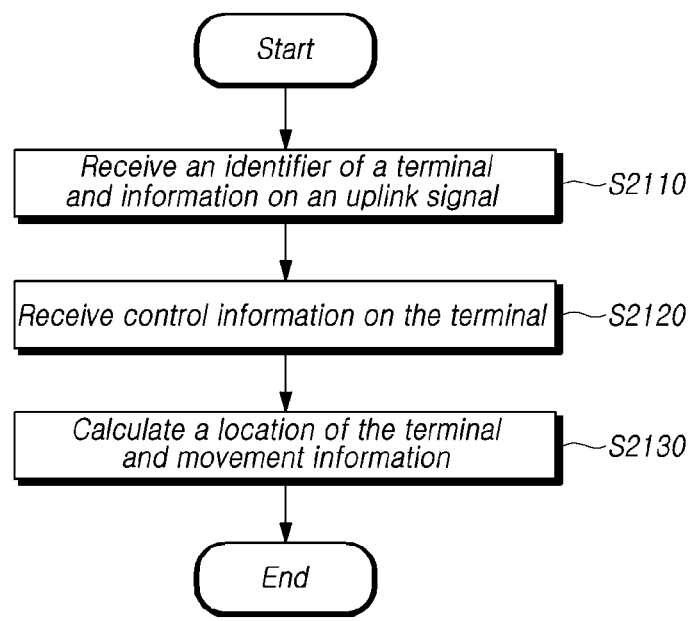
FIG. 21 is a flow diagram illustrating a location measurement method according to an aspect of the present disclosure.

FIG. 21 is a flow diagram illustrating a location measurement method according to an embodiment of the present disclosure.

Referring to FIG. 21, the location measurement method according to the embodiments of the present disclosure includes a terminal information determination step S2110 of acquiring control information on a terminal and determining identifier information of the terminal based on the control information on the terminal, and a terminal information transmission step S2120 of transmitting the identifier information of the terminal to one or more signal measurement devices. Here, the control information on the terminal may include at least one of call setting information of the terminal, parameter information used by the terminal, and handover control information.

In one embodiment, the location measurement server may receive a signal including control information on a terminal from the signal measurement device. In one embodiment, the location measurement server may directly receive a signal including control information on a terminal from a base station. In this case, the location measurement server can acquire the control information on the terminal based on a signal received by a receiver.

Further, the location measurement server may receive information on respective received uplink signals from one or more signal measurement devices. Here, the information on the uplink signal may include at least one of identifier information of the terminal that has transmitted the uplink signal, signal intensity information of the uplink signal, and information on a time at which the uplink signal is received. Further, the location measurement server can determine location information of the terminal and movement information based on the control information on the terminal and information on the uplink signal. Further, the location measurement server may transmit the determined location information and the movement information to one or more signal measurement devices.

Discussions of embodiments of FIGS. 3 to 19 may be referred to for the signal measurement method and the embodiments of FIGS. 20 and 21.

The terms "system", "processor", "controller", "component", "module", "interface", "model", "unit", and the like, may generally refer to computer-related entity hardware, a combination of hardware and software, software, or software in execution. For example, such elements described above may be, but are not limited to, a process driven by the processor, a control processor, an entity, a running thread, a program and/or a computer. For example, when an application runs on a controller or a processor, all of the application, the controller or the processor can become one element. One or more components can be included within a process and/or thread of execution, and a component can be placed on one system or be disposed on more than one system.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the scope of the present disclosure shall not be limited to such embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority under 35 U.S.C § 119(a) of Patent Application No., Patent Application No. 10-2018-0081013 filed on Jul. 12, 2018, Patent Application No. 10-2018-0122514 filed on Oct. 15, 2018, and Patent Application No. 10-2019-0083717 filed on Jul. 11, 2019 in Korea, the entire contents of which are incorporated herein by reference. In addition, this non-provisional application claims priorities in countries other than the U.S. for the same reason based on the Korean Patent Applications, the entire contents of which are hereby incorporated by reference.

What is claimed is:
1. A signal measurement device comprising:
one or more downlink signal receivers configured to receive a downlink signal;
a controller configured to acquire uplink resource assignment information; and one or more uplink signal receivers configured to receive an uplink signal transmitted from a terminal to a mobile communication network, based on the uplink resource assignment information, wherein the controller is further configured to change an operation frequency as time passes.

2. The signal measurement device according to claim 1, wherein, when changing the operation frequency, the controller is further configured to obtain and store system information configured about the mobile communication network when the operation frequency is a first value for a first time period, wherein the controller is further configured to use the stored system information when the operation frequency changes and returns to the first value.

3. The signal measurement device according to claim 2, wherein when the system information configured about the mobile communication network is changed according to the change of the operation frequency, the controller is further configured to obtain and store the changed system information.

4. The signal measurement device according to claim 1, wherein the controller is further configured to obtain synchronization information about the uplink signal transmitted from the terminal to the mobile communication network based on the downlink signal, wherein the controller is further configured to perform synchronization with at least one other signal measurement device located within a predetermined distance from the signal measurement device based on the synchronization information.

5. The signal measurement device according to claim 4, wherein the controller is further configured to change the operation frequency to the same value simultaneously with the at least one other signal measurement device.

6. The signal measurement device according to claim 4, wherein the controller is further configured to instruct the at least one other signal measurement device to change an operation frequency of the at least one other signal measurement device to be the same value as the operation frequency of the signal measurement device.

7. The signal measurement device according to claim 4, wherein the controller is further configured to change the operation frequency to the same value as an operation frequency of the at least one other signal measurement device based on an instruction received from an external control device.

* * * * *